United States Patent [19]

Takahashi et al.

[11] Patent Number: 6,044,136

[45] Date of Patent: Mar. 28, 2000

[54] TELEPHONE TERMINAL AND TELEPHONE EXCHANGE SYSTEM ACCOMMODATING THE TERMINAL

[75] Inventors: Toshie Takahashi; Takashi Sato, both of Fukushima, Japan

[73] Assignee: Hitachi Telecom Technolgies, Ltd., Koriyama, Japan

[21] Appl. No.: 08/776,520

[22] PCT Filed: Jun. 5, 1996

[86] PCT No.: PCT/JP96/01508

§ 371 Date: Feb. 3, 1997

§ 102(e) Date: Feb. 3, 1997

[87] PCT Pub. No.: WO96/39771

PCT Pub. Date: Dec. 12, 1996

[30] Foreign Application Priority Data

Jun. 6, 1995 [JP] Japan ................................. 7-162814

[51] Int. Cl.[7] .......................... H04M 1/64; H04M 11/00; H04M 1/00; H04M 3/42

[52] U.S. Cl. ..................... 379/93.23; 379/88.11; 379/93.05; 379/156; 379/214

[58] Field of Search ................. 379/67, 88, 89, 379/96, 67.1, 69, 74, 75, 88.11, 88.13, 93.05, 156, 157, 159, 214, 93.11, 93.17, 93.23

[56] References Cited

U.S. PATENT DOCUMENTS

| | | |
|---|---|---|
| 4,481,382 | 11/1984 | Villa-Real . |
| 4,823,108 | 4/1989 | Pope ........................................ 340/721 |
| 4,839,919 | 6/1989 | Borges et al. .............................. 379/96 |
| 4,975,896 | 12/1990 | D'Agosto, III et al. .................. 379/29 |
| 5,001,710 | 3/1991 | Gawrys et al. ....................... 370/110.1 |
| 5,003,577 | 3/1991 | Ertz et al. ................................. 379/89 |
| 5,142,564 | 8/1992 | Chu ........................................... 379/67 |
| 5,153,906 | 10/1992 | Akiyama ................................. 379/112 |
| 5,283,818 | 2/1994 | Klausner et al. .......................... 379/67 |
| 5,327,486 | 7/1994 | Wolff et al. ............................... 379/96 |
| 5,400,393 | 3/1995 | Knuth et al. .............................. 379/88 |
| 5,440,625 | 8/1995 | Akiyama ................................. 379/216 |
| 5,457,738 | 10/1995 | Sylvan ...................................... 379/96 |
| 5,524,049 | 6/1996 | Akiyama ................................. 379/216 |
| 5,526,353 | 6/1996 | Henley et al. ......................... 370/60.1 |

FOREIGN PATENT DOCUMENTS

| | | |
|---|---|---|
| 57-188167 | 11/1982 | Japan . |
| 60-116259 | 6/1985 | Japan . |
| 4-227363 | 8/1992 | Japan . |

OTHER PUBLICATIONS

"Nikkei Electronics", (No. 601), pp. 115–127, Feb. 14, 1994.

Primary Examiner—Fan S. Tsang
Assistant Examiner—Allan Hoosain
Attorney, Agent, or Firm—Foley & Lardner

[57] ABSTRACT

A telephone terminal has a large size display indicating a telephone operation display of a touch panel system and it is used, for example, in a dealing speech system of financial organizations and the like. The telephone terminal has telephone operation indication functions which control the large display, as well as a master controller for controlling the display depicting telephone operation indications (pagination keys) and a slave controller for controlling the handlings concerning communication functions in order to obtain improved communication functions of the telephone terminal proper. These of the master controller and slave controller are cooperatively functioned to control these telephone indication functions and communication functions.

29 Claims, 29 Drawing Sheets

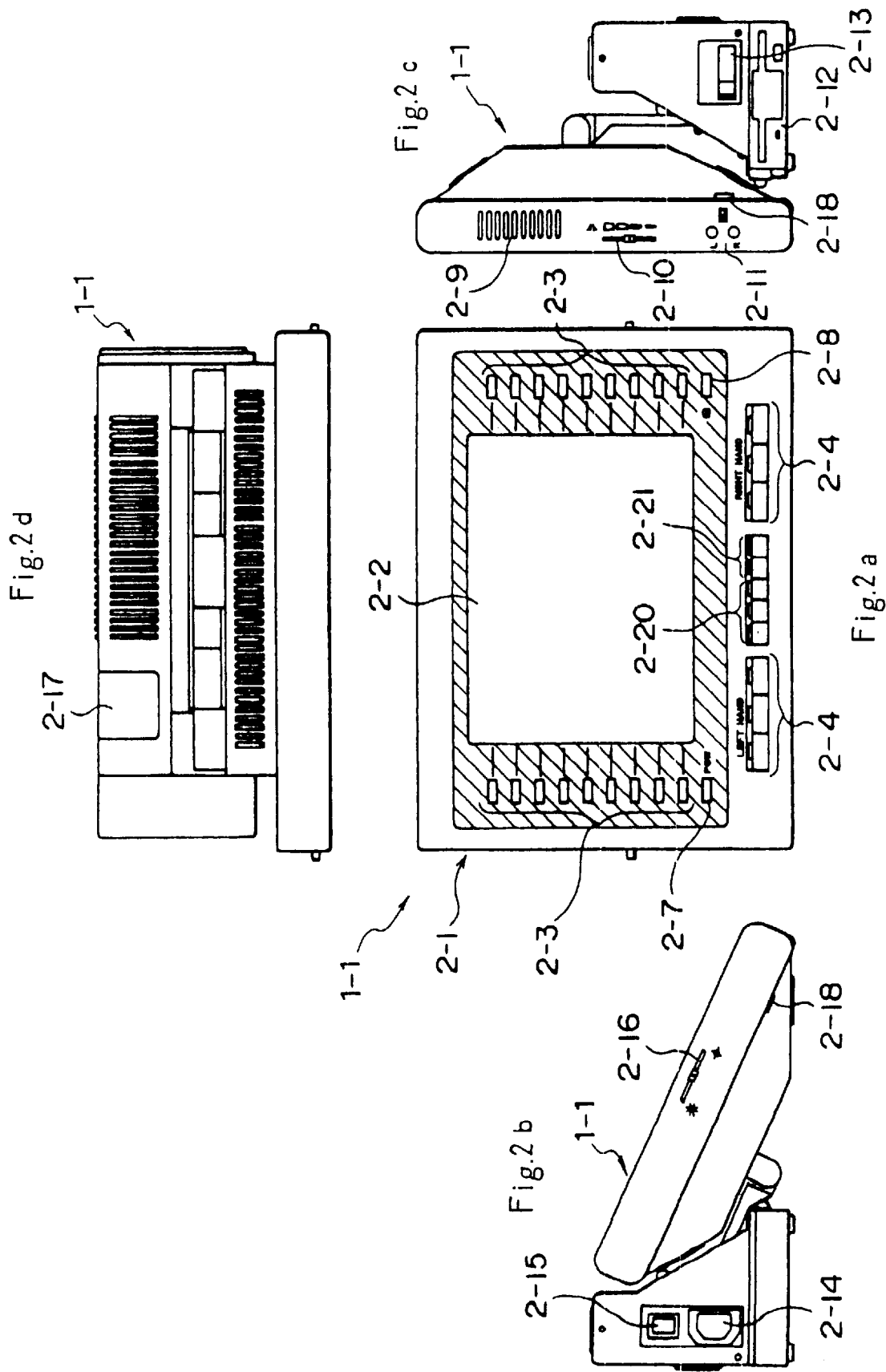

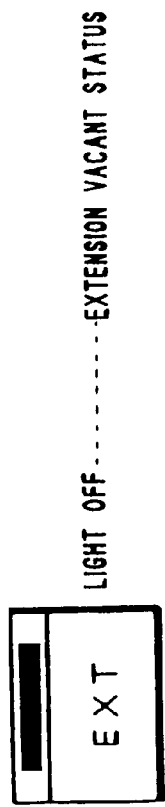
Fig.15a — LIGHT OFF······EXTENSION VACANT STATUS
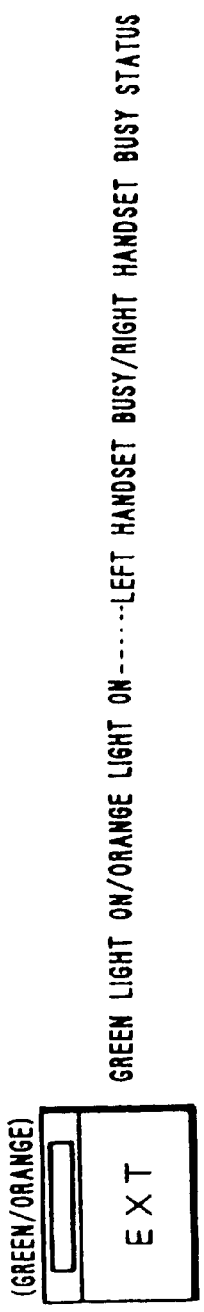
Fig.15b — GREEN LIGHT ON/ORANGE LIGHT ON······LEFT HANDSET BUSY/RIGHT HANDSET BUSY STATUS
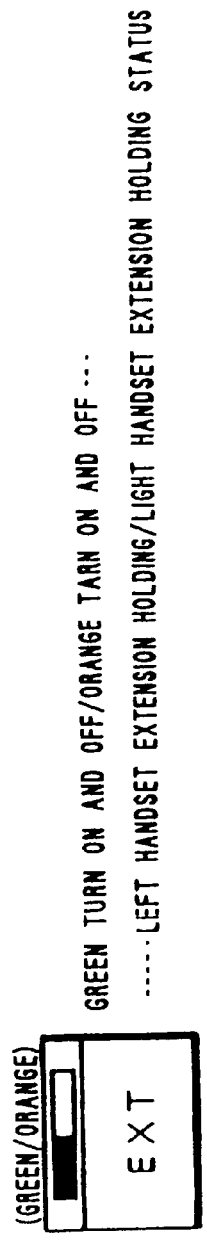
Fig.15c — GREEN TURN ON AND OFF/ORANGE TARN ON AND OFF······LEFT HANDSET EXTENSION HOLDING/LIGHT HANDSET EXTENSION HOLDING STATUS
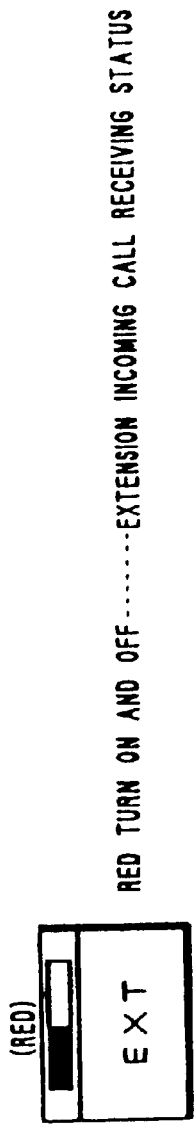
Fig.15d — RED TURN ON AND OFF······EXTENSION INCOMING CALL RECEIVING STATUS Fig.16a  ·········· LINE VACANT STATUS Fig.16b 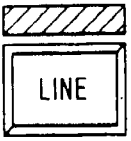 ·········· BUSY THROUGH OWN TERMINAL(GREEN/ORANGE)

Fig.16c 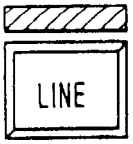 ·········· BUSY THROUGH OTHER TERMINAL(BLUE)

Fig.16d 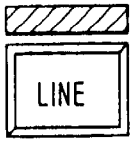 ·········· INCOMING CALL(RED)
(RAPID ON AND OFF)

Fig.16e 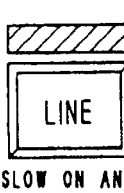 ·········· HELD ON OWN TERMINAL(GREEN/ORANGE)
(SLOW ON AND OFF)

Fig.16f  ·········· HELD ON OTHER TERMINAL(BLUE)
(SLOW ON AND OFF)

Fig.16g 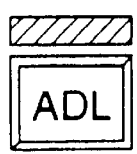 ·········· AUTO DIAL OUTGOING CALL BY OWN TARMINAL(GREEN/ORANGE)
RIGHT HANDSET:GREEN/LEFT HANDSET:ORANGE Fig.16h  ·········· MONITORING LINE BY OWN TERMINAL
(BACKGROUND RED/LETTER YELLOW)

Fig.16i 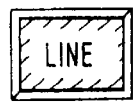 ·········· MONITORING LINE BY OTHER TERMINAL
(BACKGROUND YELLOW/LETTER RED)

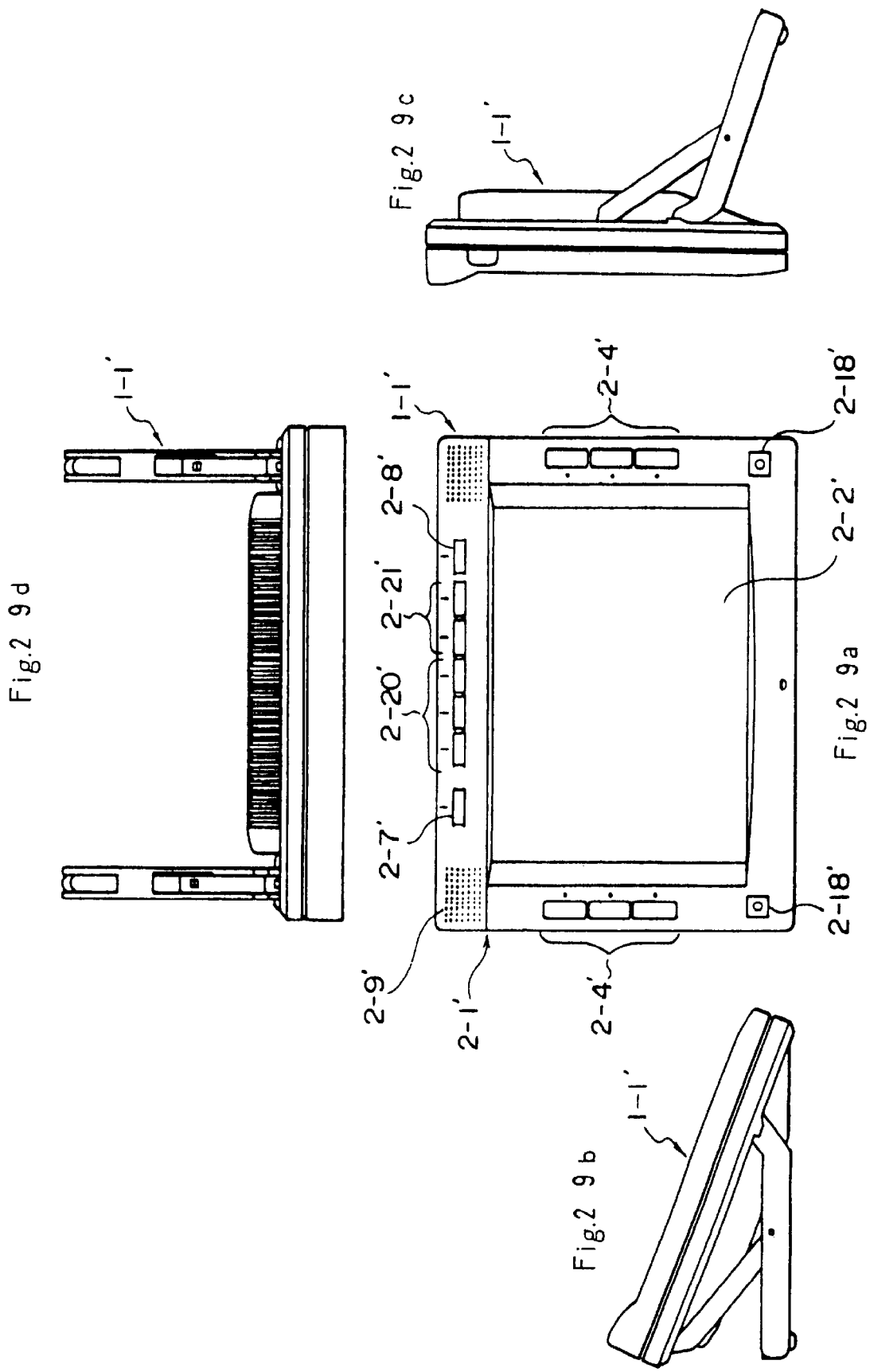

TELEPHONE TERMINAL AND TELEPHONE EXCHANGE SYSTEM ACCOMMODATING THE TERMINAL

RELATED APPLICATIONS

This application is the National Stage application of PCT/JP96/01508, filed Jun. 5, 1996.

TECHNICAL FIELD

This invention relates to telephone terminals, such as speech terminals of a financial dealing speech system used for financial dealing in financial institutions of banks and security companies and the like, speech terminals for dealing precious metals, reception terminals of taxi companies and transportation companies and the like, emergency speech terminals for holiday bank accounting, or telephone used in ordinary offices, and a telephone exchange system accommodating such terminals.

BACKGROUND OF THE INVENTION

The conventional telephone terminals used in the telephone exchange system or the dealing speech system have been used exclusively for speech functions. When a personal computer is used in such situation, the personal computer must be placed on a different space of the desk from that of telephone terminals. Therefore, the space on the desk become narrower to place other things. A concept of, so called, computer telephony has been proposed, which has a personal computer provided with a telephone function so as to solve such problem of desk space to place the personal computer and the telephone terminal.

Also, of a touch panel type, a multi-function telephone terminal is provided with a display and a touch panel screen displayed on the display. On the touch panel screen of this telephone terminal, ten-key (dial buttons), auto-dial keys, function keys providing special services, and the like are displayed.

In addition, a multi-function telephone terminal having a pagination function includes a monochrome display, and the status of the line in the telephone terminal has been displayed by changing the frame color of a line key displayed on the touch panel screen of the monochrome display, reversing the line key on the screen, flickering the line key on the screen or combining such the changing reversing and flickering.

It is noted that the prior art concerning the invention is described in Japanese Patent specification Laid-open sho57 (1982)-188167, sho60 (1985)-116259, hei4(1992)-227363, and the U.S. Pat. No. 4,823,108, U.S. Pat. No. 5,001,710 U.S. Pat. No. 5,003,577, and a journal "Nikkei Electronics" on Feb. 14, 1994(No.601) pp115 to 127.

However, the conventional telephone terminal described above has a problem in the response with reference to the telephone exchange connection. It is difficult to employ such conventional telephone terminals in the telephone exchange system, for example, a dealing speech system to request an instantaneous dealings and a high line-catching speed.

When the transmission of an outgoing call and the reception of an incoming call of the telephone terminal are controlled by a control package (PC board) of a personal computer, an operation of the transmission and reception processing with respect to such control is executed through an operating system of the PC board, so it is difficult to operate the cyclic programs of the PC board and the telephone function. Also, when a disc accessing is carried out in the PC board, an application program is waiting, thereby consuming a long time operation for a process of a speech connection of the telephone.

The telephone exchange system necessitates a 24 hour running operation. However, the operating system (OS) of the PC board has a problem in reliability, because, when the operating system operates running for a long time, it may become locked.

Additionally, the conventional multi-function telephone terminal having the pagination key function displays the indication of the line status on the screen of the monochrome display. Accordingly, as there is a limit in the number of the indication of the recognizable status, and when the monochrome display displays the indication of the line kind on the screen, there is another problem of cancelling the number of characters of the line name with reference to the line kind on the screen.

This invention has been made considering such problems mentioned above of the prior art, and it is an object of this invention to provide a telephone terminal enabling to deal an ordinary or normal information indicated on a large size display installed thereon, which terminal has a function to improve considerably a processing speed of speech function, particularly a line-catch speech and a function to display information with respect to a line in its small size and high performance, and a telephone exchange system accommodating such telephone terminal.

It is another object of this invention to provide a telephone terminal having a high reliability, which is automatically and instantaneously reset when the processing function of the telephone terminal is in an abnormal condition.

Still another object of this invention is to provide a telephone terminal that is easy to use by displaying various functions with reference to speech control of the telephone terminal on the large screen of the large display.

Further still, another object of this invention is to provide a telephone exchange system enabling to manage the data necessary to make the telephone terminal execute its processing operation by means of an integral management terminal of the telephone exchanger, to download the data from the integral management terminal to the telephone terminal, and to upload the data stored in the telephone terminal to the integral management terminal, and to have the telephone exchange system carry out its maintenance easily.

DISCLOSURE OF THE INVENTION

In order to attain the above-mentioned objects, a telephone terminal, according to this invention, connected to a line has a display, a first controller for controlling the display, a line control means for carrying out an interfacing function with the line, a detection means for detecting an operation selection of an information with reference to speech control displayed on the display, and a second controller for controlling the line control means and the detections means, the second controller has a means for sending a display indication information corresponding to a selection information to the first controller and sending a speech control information to the line control means when the second controller receives the selection information corresponding to the operation selections from the detection means.

Additionally, the telephone exchange system according to the invention includes, in order to attain the objects thereof mentioned above, of a exchanger provided with a trunk connected to the public telephone line, a digital telephone terminal line circuit connected to the telephone terminal, a speech channel switch for changing the connection with the trunk and connecting the trunk and the digital telephone terminal line circuit, and a central controller for controlling the switching operation of the speech channel switch, and the telephone terminal, wherein the telephone terminal has a display, a first controller for controlling the display, a line control means for executing interfacing function with the line, a detection means for detecting an operation selection with reference to speech control displayed on the display, and a second controller for controlling the line control means and the detection means; the second controller has a means adapted to send a display indication information corresponding to a selection information to the first controller and speech control information to the line control means when the second controller receives the selection information corresponding to the operation selections from the detection means.

Consequently, it is possible to provide a small and high performance telephone terminal provided with a large display enabling to process ordinary information, whose control function is divided into that of the first controller for controlling the large display and the second controller for controlling the executions with reference to speech function or speech controls, these first and second controllers are so cooperated as to control the telephone terminal in order to considerably improve a processing speed of speech function, in particular, a line-catching speed and also to improve the line indication function and the usability of the telephone terminal.

Also, it is possible to provide a high reliable telephone terminal which is, when the processing function is in an abnormal condition, able to automatically be reset in order to be adapted instantly to cope with such abnormal situation.

It is possible to provide through the invention a telephone terminal having an easiness-in-use obtained by the large display indicating various function indications with reference to speech control.

Furthermore, according to the telephone exchange system of the invention, it is possible to provide a telephone exchange system having an easy management and maintenance, wherein the data necessary to execute a processing of the telephone terminal is managed by an integral management terminal of the telephone exchanger, the integral management terminal makes the data enable to be downloaded to the telephone terminal, and other data stored in the telephone terminal enable to be uploaded.

BRIEF DESCRIPTION OF THE DRAWINGS

FIG. 2(a) thereof is a front view,

FIG. 2(b) is a left side elevation of the telephone terminal slanted,

FIG. 2(c) is a right side elevation, and (d) is a plane view of the telephone terminal.

FIGS. 15(a)–15(d) are explanation views depicting a display condition of LED correspondingly placed to the extension keys of the telephone terminal according to the embodiment;

FIG. 15(a) thereof shows an idle extension,

FIG. 15(b) shows a busy left/right handset,

FIG. 15(c) shows a holding left/right handset extension,

FIG. 15(d) is an incoming extension.

FIGS. 16(a)–16(i) are explanation views showing a display condition of line keys on pagination keys displayed on the screen of the telephone terminal according to the embodiment;

FIG. 16(a) thereof shows an idle extension,

FIG. 16(b) shows own board in busy,

FIG. 16(c) is other board in busy,

FIG. 16(d) shows an incoming call,

FIG. 16(e) shows own board under holding,

FIG. 16(f) shows other board under holding,

FIG. 16(g) shows an auto-dial own board of outgoing call,

FIG. 16(h) shows own board line at monitoring,

FIG. 16(i) shows other board line at monitoring.

FIG. 21(a) thereof is a flow chart depicting color control method and

FIG. 21(b) is a color indication data table with reference to color control.

FIG. 24 is a flow chart showing a response control outline of the slave controller placed within the telephone terminal of the embodiment.

FIGS. 29(a)–29(d) show an appearance of the telephone terminal according to the embodiment of the invention;

FIG. 29(a) thereof is a front view,

FIG. 29(b) is a left side elevation of the telephone terminal slanted,

FIG. 29(c) is a right side elevation, and (d) is a plane view.

DETAILED DESCRIPTION

Hereinafter, the embodiments of the invention will be described with reference to the drawings. It is noted that, in the embodiments, the telephone exchange system is used in, for example, a dealing speech system which has been used for financial dealing in financial institutions, such as security companies.

Figure 1:
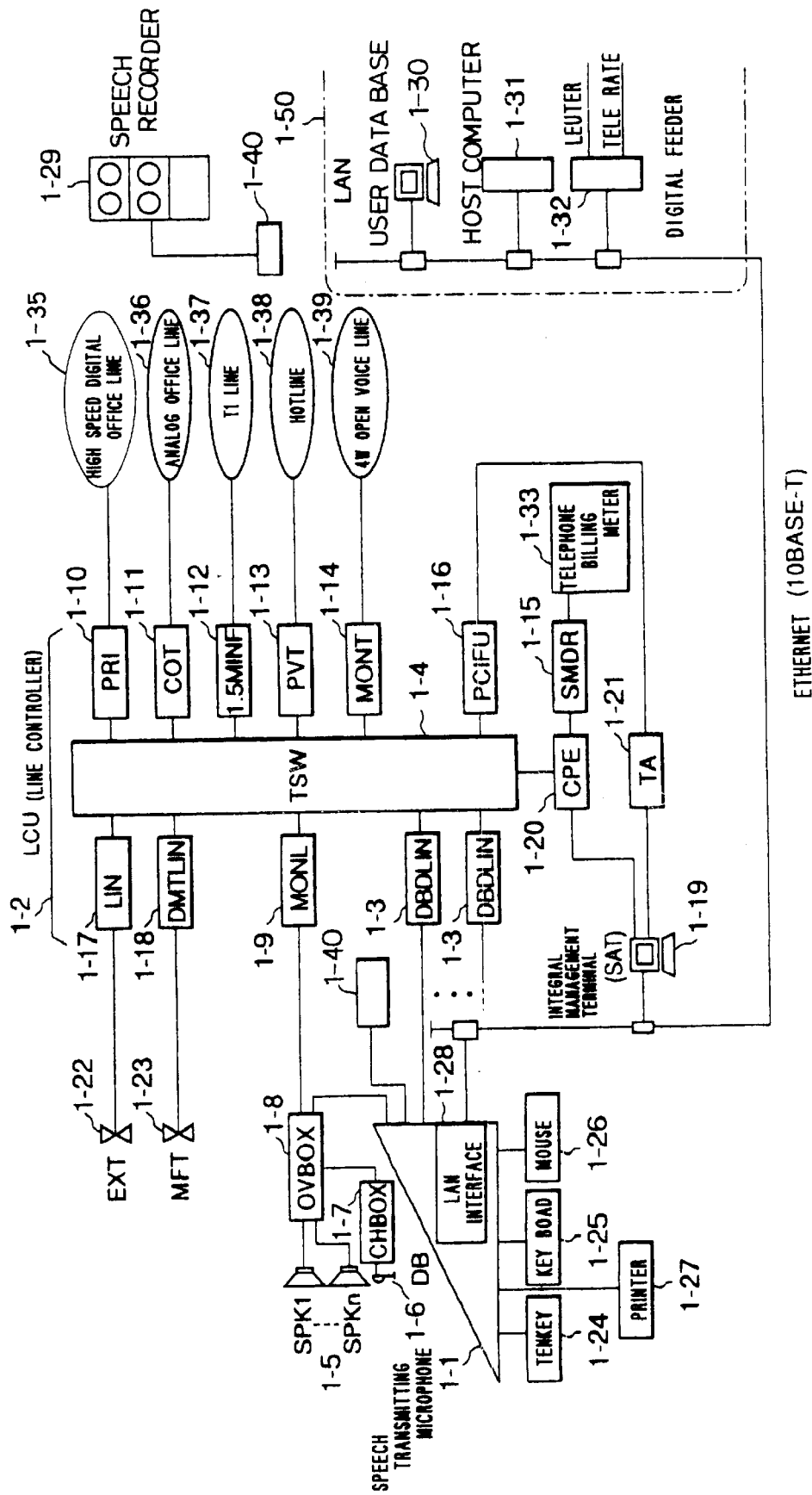
FIG. 1 is system structure view showing a dealing speech system accommodating the telephone terminal according to the invention.

FIG. 1 is a system structure view showing a dealing speech system accommodating the telephone terminal of the invention.

As shown in FIG. 1, a plurality of telephone terminals (DB)1-1 used with reference to a line call transmission and reception are accommodated in a line controller (LCU) executing a call transmission and reception. That is, a line controller (LCU) 1-2 has a speech path switch (TSW) 1-4 freely changing the connection with reference to these calls and connecting these calls. A telephone terminal 1-1 is connected to a digital telephone terminal line circuit (DBDLIN) 1-3 accommodated in the speech path switch 1-4.

The digital telephone terminal line circuit 1-3 is connected to the telephone terminal 1-1 by an I interface of digital line interface. S point of the I interface is connected to the digital telephone terminal line circuit 1-3. Channels B1 and B2 of the I interface are used as a speech channel and are logically and structurely connected to the speech path switch 1-4.

There are a plurality of monitor speakers (1–n) 1-5, speech transmitting microphone 1-6, transmission change box (CHBOX) 1-7 connected to these transmitting microphones 1-6, and an open voice box (OVBOX) 1-8 connected to each monitor speaker 1-5 and to transmission change box 1-7, as an open voice means for transmitting sound information with reference to the dealing. Such open voice means are connected according to the kind of business to the telephone terminal 1-1 necessitating to accommodate open voice lines.

Additionally, the open voice boxes 1-8 correspondingly provided to a plurality of speakers 1-5 are connected to a four-wire type monitor line circuit (MONL) 1-9 of a line circuit exclusively used to the open voice boxes 1-8, and the four-wire type monitor line circuit 1-9 is accommodated in the speech path switch 1-4.

The speech path switch 1-4 accommodates a primary group interface (PRI) 1-10 of an interface to a high speed digital office line 1-35, an office line trunk (COT) of an interface with an analog office line 1-36, 1.5M interface trunk (1.5M INF) 1-12 of an interface to T1 line 1-37 of 1.5M digital exclusive line, a trunk for exclusive line (PVT) 1-13 of an interface to exclusive line used as a hot line 1-38, and four-wire type monitor trunk (MONT) 1-14 of an interface to exclusive line used as a four-wire type (4W) open voice line 1-39.

Furthermore, the speech path switch 1-4 contains, other than these lines, PC interface trunk (PCIFU) 1-16 and is connected to an integral management terminal (SAT) 1-19 through a terminal adapter (TA) 1-21 at the S point interface.

The integral management terminal 1-19 is a processor for managing the entire dealing speech system, which terminal is connected to a central controller (CPE) 1-20 for controlling the whole line controller (LCU) 1-2.

The system can accommodate general or public telephones (EXT) 1-22 and multi-function telephone (MFT) 1-23, as well as telephone terminal (DB) 1-1 of speech means. The general telephone (EXT) 1-22 is connected to the speech path switch (TSW) 1-4 through the line circuit (LIN) 1-17. The multi-function telephone (MFT) 1-23 is connected to the speech path switch (TSW)1-4 through a digital multi-function telephone line circuit (DMTLIN) 1-18.

The central controller 1-20 is connected to a telephone billing meter interface apparatus (SMDR) 1-15, and billing information is transmitted to a telephone billing meter 1-33 through the telephone billing meter interface apparatus 1-15, and the telephone billing meter sums up the telephone speech bill.

The telephone terminal 1-1 has an interface portion, to which portion a ten-key keyboard 1-24, a full keyboard 1-25, a mouse 1-26, and a printer 1-27 of outer apparatus are connected.

The ten-key keyboard 1-24 and the mouse 1-26 are adapted to use in various selection operations, for example, dial input operations with reference to the line display (telephone function display) depicted on a screen (pagination keys) displayed by the display of the telephone terminal 1-1 which will be described later.

In addition, connecting and using the full keyboard 1-25 enables to use the telephone terminal 1-1 as a personal computer. The printer 1-27 can be similarly connected to the personal computer.

It is possible to provide a LAN interface 1-28 on the telephone terminal 1-1. Accordingly, new applications of entering into the conventional LAN through an Ethernet (10 BASE-T or 10 BASE 2) by a provision of LAN interface 1-28, of accessing to the data base within LAN 1-50 and inputting of a predetermined data into a host computer 1-31 by a provision of new LAN, and of displaying digital feed data on the basis of access to the digital feeder 1-32 can be attained. These new applications have been difficult to attain by the conventional telephone terminal.

Additionally, the telephone terminal 1-1 has a speech record output interface portion 1-40 for outputting speech contents and the terminal 1-1 is connected to a speech recorder 1-29 through the speech record output interface portion 1-40, so that all the contents are recorded in the speech recorder 1-29.

Figure 2:
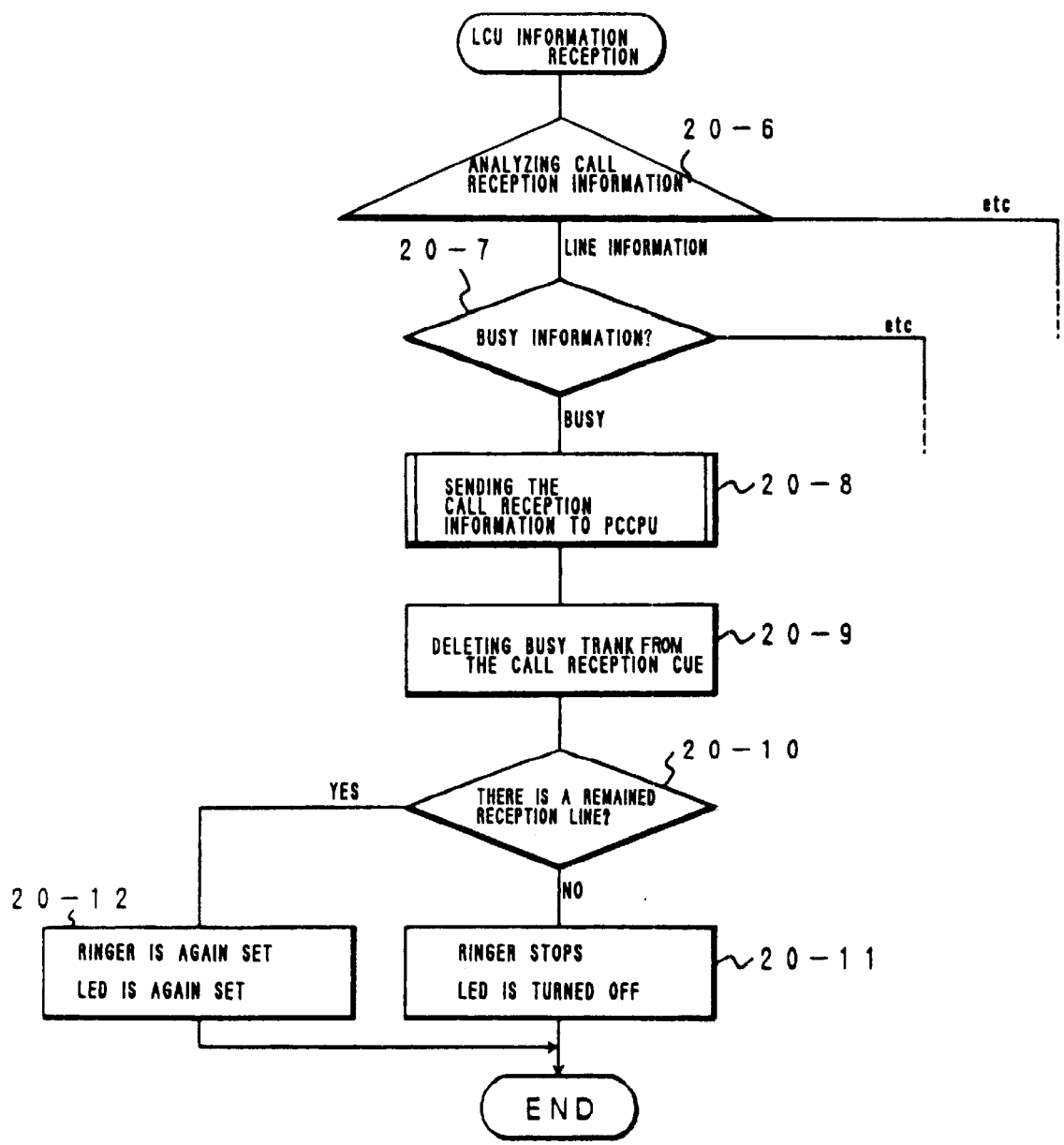
FIGS. 2(a)–(c) are appearance views of the telephone terminal according to one embodiment of the invention.

FIGS. 2(*a*)–2(*d*) are appearance views of the telephone terminal 1-1 shown in FIG. 1; FIG. 2(*a*) thereof is a front view, FIG. 2(*b*) is a left side elevation of telephone terminal 1-1 slanted, FIG. 2(*c*) is a right side elevation, and FIG. 2(*d*) is a plane view of the terminal.

As shown in FIGS. 2(*a*)–2(*d*), on a board of a housing 2-1 of telephone terminal 1-1, there are a pagination key (screen) 2-2 constructed by a color display TFT/STN color LCD display) 3-30 of about 10 inch and a pressure sensitive touch panel 3-3 placed on the color display 3-30, a hard key 2-3 operable cooperatively with the pagination key 2-2, a plurality of functional keys 2-4 provided correspondingly for left/right hand sets (not shown), a plurality of extension keys 2-21, a plurality of central reception indication response (incoming call only) keys 2-20 placed respectively every the line kind, POW key 2-7 for turning on-and-off a power source of the terminal 1-1 by means of a software program, and Telephone Display Return key 2-8 for changing the screen contents by one-touch from a personal computer function active status (personal computer application screen) to a line display active status (telephone function screen), as shown in FIG. 2(*a*).

As shown in FIG. 2(*c*), there are hands-free speaker 2-9, a sound volume controller lever 2-10 for adjusting sound volume of the output from the hands-free speaker 2-9, a tape recorder connection jack 2-11, a floppy disc drive 2-12, and an angle adjustable lock lever 2-13 for adjusting the display board angle of the telephone terminal 1-1 within a range of 20 to 90 degree, respectively installed on right side of the housing 2-1.

As shown in FIG. 2(*b*), there are a power source input connector 2-14, a main power source switch 2-15 for turning the power source of the telephone terminal 1-1 on and off, a screen luminosity controller 2-16, and a hand-set connecting modular jack 2-18 for connecting the right or left hand-set respectively installed on left side of the housing 2-1.

Also, as shown in FIG. 2(*d*), the housing 2-1 has a microphone attaching portion 2-17 to which the hands-free microphone is attached.

Figure 3:
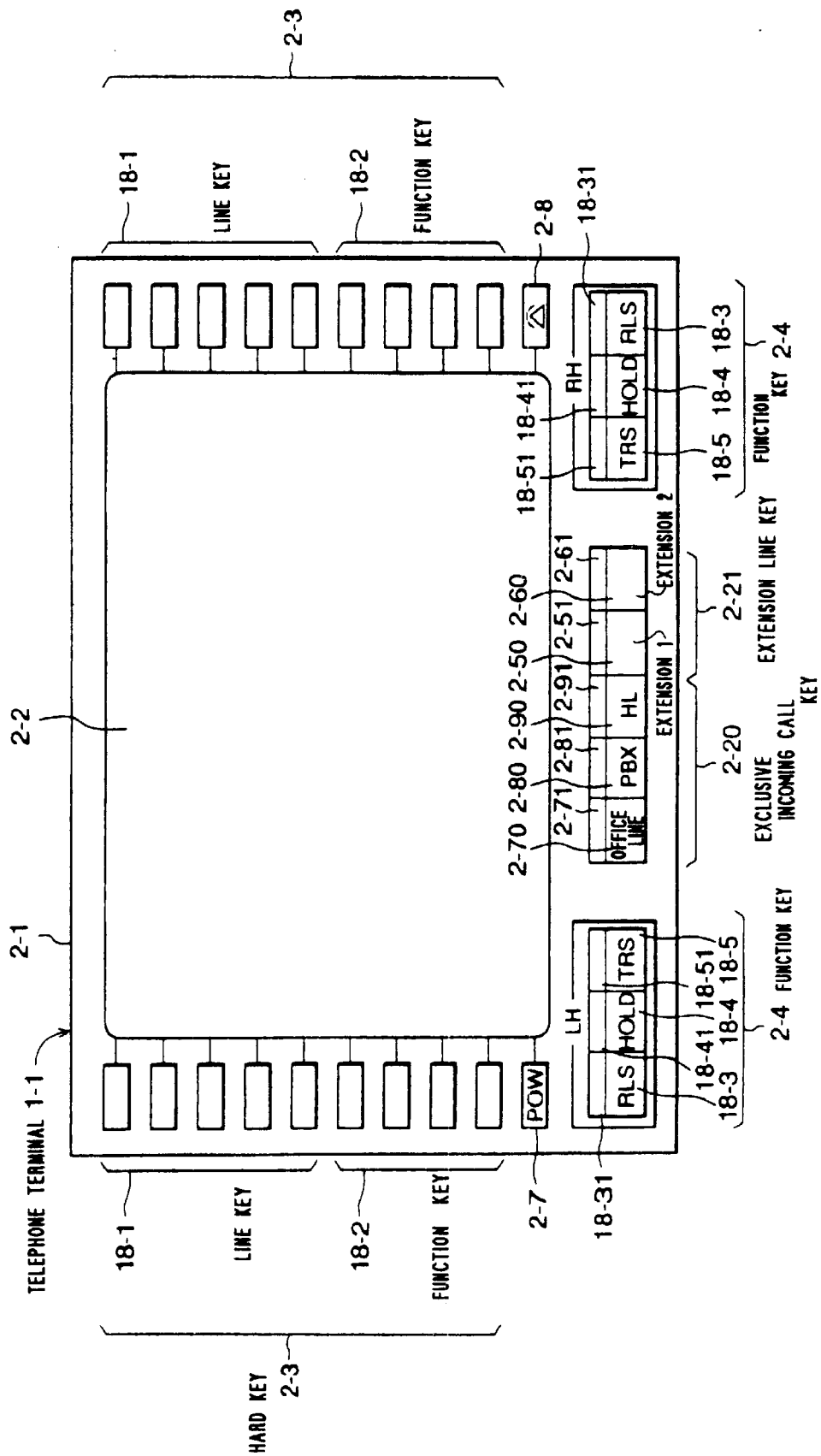
FIG. 3 is a board view of the telephone terminal according to the embodiment.

FIG. 3 is a board view of the telephone terminal 1-1 of FIG. 2. As shown in FIG. 3, at the center of the board of housing 2-1 of the terminal 1-1, a pagination key 2-2 of a combination of a color display 3-30 and a pressure sensitive touch panel 3-31 is placed. At left and right sides of the board by the pagination key 2-2, 10 (ten) line keys 18-1 and 8 (eight) function keys 18-2 of the hard keys 2-3 are operable in cooperation with left and right key rows of the pagination key 2-2.

A RLS key 18-3 to be pushed to end a speech, a HOLD key 18-4 to be pushed to hold the busy line, and a TRS key 18-5 to be pushed to transfer or relay the busy line to another telephone terminal or a telephone, are placed on the lower portion of the board as function key 2-4 corresponding to the left and right hand-sets.

At the center of the board lower portion, there are Extension 1 key 2-50 and Extension 2 key 2-60 of the extension key 2-21 for executing an extension call transmission or an extension reception call response, and Office key 2-70, PBX line key 2-80 and Hot Line key 2-90 of integral call reception display response (exclusive incoming call reception) key 2-20 which is installed for every line kind and used as an integral call reception display response (exclusive incoming call reception) key 2-20.

There are POW key 2-7 for turning via the software, the power source on and off, and Telephone Screen Return key 2-8 for changing by one touch operation from Personal Computer Usage Screen to telephone function screen on the left and the right lower portions of the board.

LED 18-31, 18-41 and 18-51 each showing the conditions of the RLS key 18-3, HOLD key 18-4 and TRS key 18-5 are provided above these keys. Similarly LED 2-51, 2-61, 2-71, 2-81 and 2-91 are provided just above the Extension 1 key 2-50, Extension 2 key 2-60, Office key 2-70, PBX Line key 2-80 and Hot Line key 2-90 in order to show the conditions of these keys.

Figure 4:
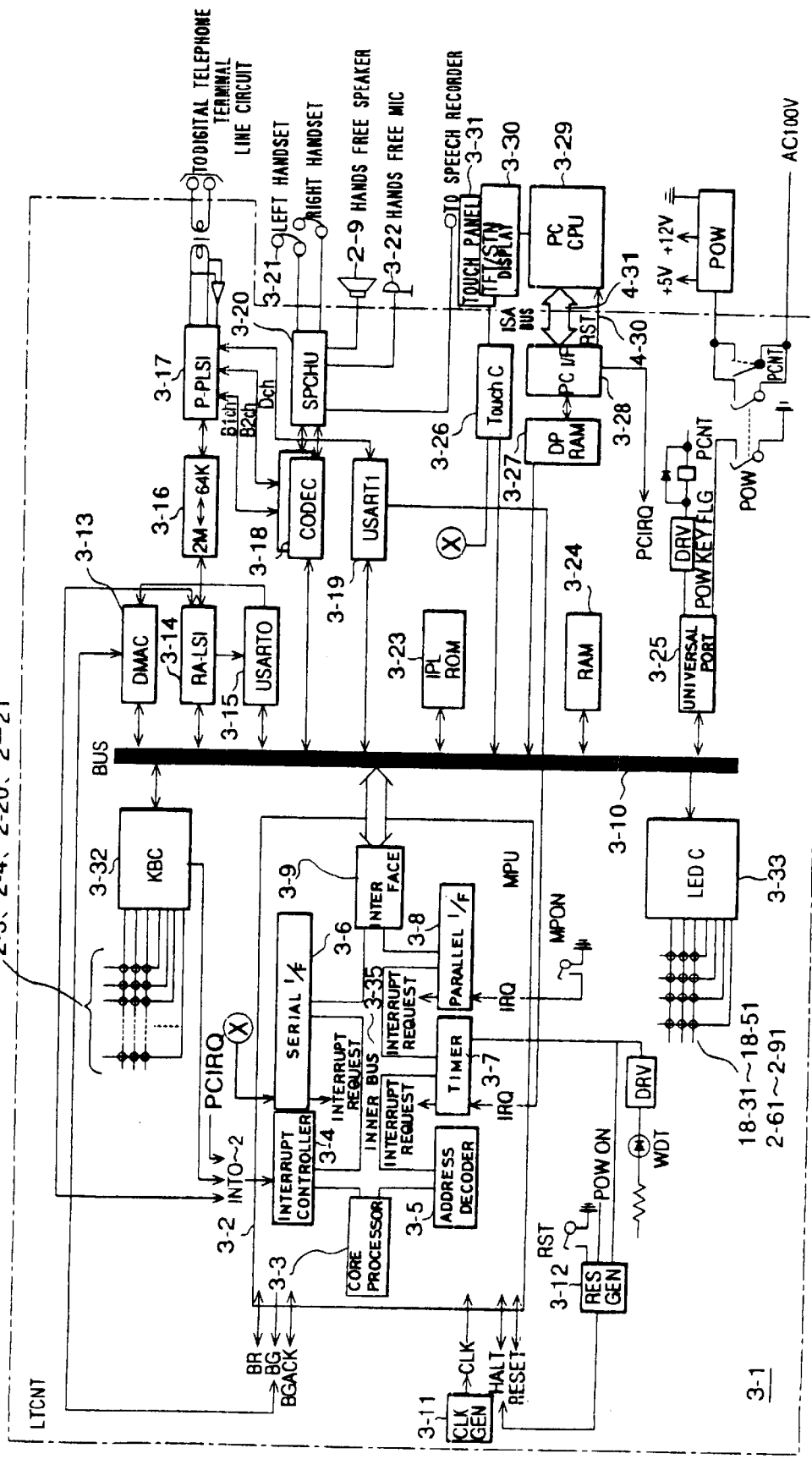
FIG. 4 is a block diagram depicting within a slave controller placed in the telephone terminal according to the embodiment.

Hereinafter, slave controllers (line trunk controllers) placed in the telephone terminal 1-1 will be explained. FIG. 4 is a block diagram depicting an outline of the interior of the slave controller within the telephone terminal 1-1.

As shown in FIG. 4, the line trunk controller (LTCNT) 3-1 installed in the telephone terminal 1-1 is the slave controller connected with a digital telephone terminal line circuit 1-3 of a line controller 1-2 so as to control line transmission and reception.

A microprocessor (MPU) controlling whole line trunk controller (slave controller) 3-1 is structured by a core processor 3-3, an interrupt controller 3-4, an address decoder 3-5, a serial interface 3-6, a timer 3-7, a parallel interface 3-8 and an interface 3-9. These structural parts are mutually connected by an inner bus 3-35.

This microprocessor 3-2 functions in response to the signals from a reset signal generator circuit (RESGEN) 3-12 and a clock generator circuit (CLKGEN) 3-11, which are connected to the microprocessor 3-2.

The bus 3-10 is connected to the microprocessor 3-2; a keyboard controller (KBC) 3-32 executing the control function of all keys on the board of the telephone terminal 1-1, for example, a hard key 2-3, a function key 2-4, telephone function return key 2-8, POW key 2-7, an exclusive incoming call reception key 2-20 and an extension key 2-21(as shown in FIG. 3, respective keys shown by 2-50, 2-60, 2-70, 2-80, 2-90, 18-1, 18-2, 18-3, 18-4 and 18-5); LED controller (LED C) 3-33 for controlling the indication of all LED which correspond to these hard keys (as shown in FIG. 3, every LED shown by 18-31, 18-41, 18-51, 18-61, 2-71, 2-81, and 2-91); IPL ROM 3-23 storing IPL program, a working RAM 3-24 for storing an online program; a universal port 3-25 for executing read/write of hard point; a direct memory access controller (DMAC) 3-13 for controlling the downloading and uploading of telephone terminal program and office data; a communication rate adapter (RA-ISI) 3-14; a serial communication receiver/transceiver (USART0) 3-15; a codec (CODEC) 3-18; a serial communication receiver/transceiver (USART1) 3-19 for communicating through D channel with the line controller 1-2; and a touch panel controller (Touch C) 3-26 for controlling the touch panel 3-31.

The slave controller 3-1 is connected to a digital telephone terminal line circuit 1-3 through a data transmission LSI (P-PLSI) 3-17 of I interface. T data transmission LSI 3-17 is divided into B1 and B2 channels and D channel. The D channel is connected to the serial communication receiver/transceiver (USART1) 3-19 and carries out a transmission and reception of control information between D channel and the microprocessor 3-2 through the serial communication receiver/transceiver 3-19.

B1 and B2 channels divided at the data transmission LSI 3-17 are connected to the codec 3-18. The codec 3-18 converts a sound signal from its analog to digital signals or from digital to analog signals, and transmits the converted sound signal to speech or conversation channel control unit(SPCH) 3-20. That is, a sound signal is transmitted and received between the data transmission LSI 3-17 and speech channel control unit 3-20 through the codec 3-18.

The speech channel controll unit 3-20 is connected to left and right handsets 3-21, a hands-free speaker 2-9, and hands-free microphone 3-22, so that it is made possible to execute handset speech and hands-free speech. The hands-free speaker 2-9 has a function of a call reception ringer speaker, too.

When the integral management terminal 1-19 executes a download of the telephone terminal program and the office data to the telephone terminal 1-1 through a PC interface trunk 1-16 and a terminal adapter 1-21, a connection target of B2 channel divided at the transmission LSI 3-17 is changed to a speed convertor 3-16. The speed convertor 3-16 converts the B2 channel data of 64 Kbps to that of 2 Mbps and transmits B2 channel data of 2 Mbps to a speed adjustment LSI (RA-LSI) 3-14.

The speed adjustment LSI 3-14 converts B2 channel data of 2 Mbps to that of 19.2 Mbps and transmits the B2 channel data of 19.2 Mbps to serial transmission receiver/transceiver (USART0) 3-15. The serial transmission receiver/transceiver 3-15 parallely converts B2 channel data of 19.2 Mbps and sends the data to a dynamic memory access controller 3-13. This dynamic memory access controller 3-13 DMA-relays the data to RAM 3-24 through a bus 3-10.

The telephone terminal 1-1 has a master controller (PCCPU) 3-29 executing a control of whole telephone terminal mechanism, a displaying and management of office line data. Various control information and data are transmitted and changed between the master controller 3-29 and the slave controller 3-1 through a common memory (DPRAM) 3-27. In addition, the common memory and the master controller are connected mutually by an ISA bus 4-31 of PC interface 3-28.

Pagination key 2-2 mounted on a board of the telephone terminal 1-1 is constructed by TFT/STN display 3-30 and a touch panel 3-31. TFT/STN display 3-30 is controlled by the master controller 3-29 and the touch panel 3-31 is controlled by a touch panel controller 3-26.

Figure 5:
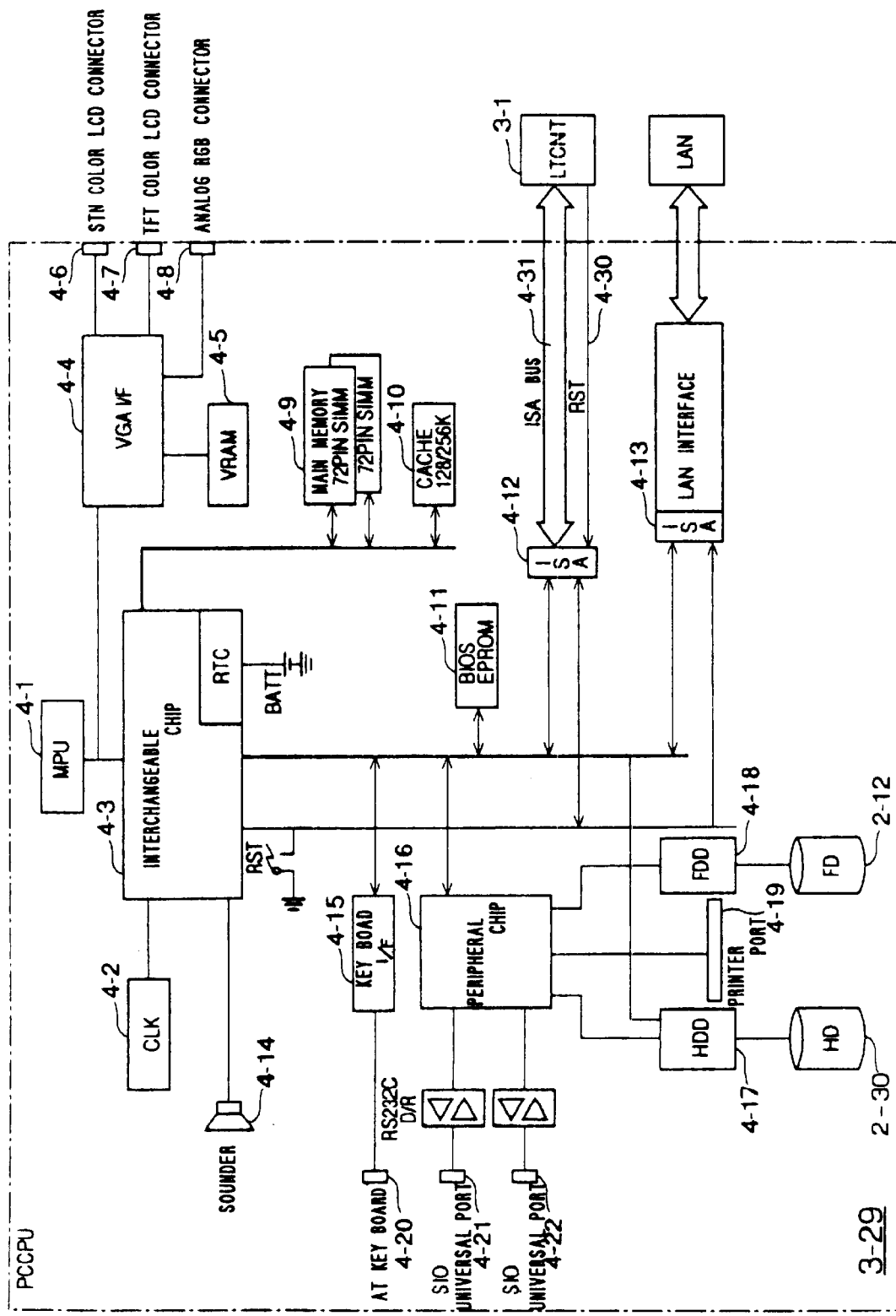
FIG. 5 is a block diagram showing within a master controller placed in the telephone terminal of the embodiment.

Here, the master controller 3-29 will be described. FIG. 5 is a block diagram showing the outline of an interior of the master controller 3-29 within the telephone terminal 1-1.

As shown in FIG. 5, the master controller 3-29 mounted within the telephone terminal 1-1 is a personal computer board (master board) providing an AT interchangeable personal computer function to the telephone terminal 1-1.

Also, as shown in FIG. 5, the master controller (PCCPU) 3-29 is structured by a microprocessor (MPU) 4-1, AT interchangeable chip 4-3 for making the architecture AT interchangeable, a clock generator circuit (CLK) 4-2, a screen control VGA interface (VGA I/F) 4-4, VRAM 4-5, a main memory 4-9, a cache memory 4-10, a basic input/output system (BIOS) 4-11, an ISA connector 4-12 connected to the slave controller (LTCNT) 3-1, an ISA connector 4-13 connected to LAN interface card, a sounder 4-14 for generating an alarm sound, a keyboard interface 4-15, and a peripheral chip 4-16.

The VGA interface 4-4 has a VL bus connected thereto so as to improve a screen control performance. There are three kinds of display output, such as a STN color LCD connector 4-6, a TFT color LCD connector 4-7, and an analog RGB connector 4-8, and these outputs can be selected through the screen displayed by the display 3-30.

The main memory 4-9 employs 72-pin SIMM memory and it is possible to mount up to 16 Mbyte of 8 Mbyte×2.

The peripheral chip 4-16 is connected to a hard disc driver (HDD) 4-17 controlling a hard disc (HD) 2-30, floppy disc driver (FDD) 4-18 controlling a floppy disc 2-12, a printer port 4-19, and two universal and serial ports 4-21, 4-22. These serial ports are used as a connection port for serial mouse.

The keyboard interface 4-15 has an AT keyboard connector 4-20.

Figure 6:
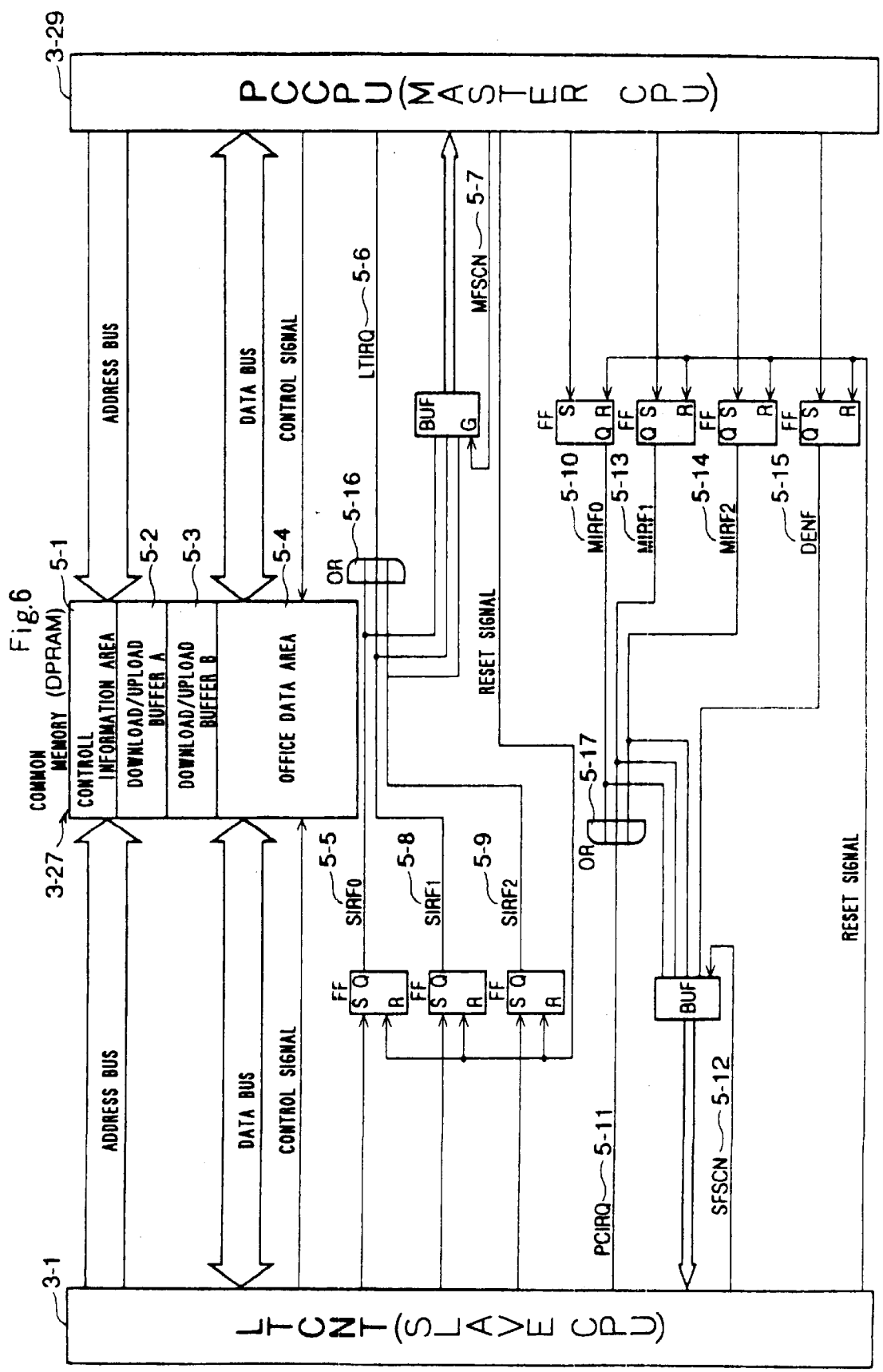
FIG. 6 shows a common memory access method employed when the slave controller and the master controller access to a common memory.

Next, an access method to the common memory 3-27 between the slave controller (LTCNT) 3-1 and the master controller (PCCPU) 3-29 will be explained. FIG. 6 shows a common memory access method to the common memory 3-27 between the slave controller 3-1 and the master controller 3-29.

As shown in FIG. 6, the common memory (DPRAM) 3-27 has input ports for address buses, data buses and control signals, at a side of the slave controller 3-1 and another side of the master controller 3-29. Accordingly, any access to the common memory 3-27 is possible from the slave controller 3-1 and the master controller 3-29 through these input ports.

The address of the common memory (DPRAM) 3-27 is allotted to a control information area 5-1, download/upload buffer A 5-2, download/upload buffer B 5-3, and an office data area 5-4.

The control information area 5-1 is used to transmit and accept call transmission and reception control information used when the transmission and reception are carried out between the slave controller 3-1 and the master controller 3-29. The area 5-1 is able to read/write-access from either the slave controller 3-1 and the master controller 3-29.

When a download is carried out, the download/upload buffer A 5-2 and the download/upload buffer B 5-3 of the area 5-1 are written by the slave controller 3-1 and read by the master controller 3-29. While an uploading, the area 5-1 is written by the master controller 3-29 and read by the slave controller 3-1.

The office data area 5-4 is used to inform a key data of a screen page from the master controller 3-29 to the slave controller 3-1. Only master controller 3-29 writes in and only the slave controller 3-1 reads the office data area.

When data is transmitted to the master controller 3-29 by the slave controller 3-1 according to an access method to the common memory 3-27, the data is written in the control information area 5-1 and SIRF0 5-5 is set. Then, an interruption from LTIRQ 5-6 to the master controller 3-29 through OR circuit 5-16 and inform the master controller 3-29 of a data transmission.

The master controller 3-29 confirms an interruption flag through MFSCN 5-7 to read out data of the control information area 5-1 corresponding to SIRF0 5-5 and reset SIRF0 5-5. A similar sequence is applied to the download/upload buffers A & B 5-2 & 5-3 using SIRF1 5-8 and SIRF2 5-9.

On the contrary, in case that master controller 3-29 transmits data to the slave controller 3-1, it is necessary to write the data in the control information area 5-1 and set MIRF0 5-10. Then, the OR circuit 5-17 interrupts the slave controller 3-1 through PCIRQ 5-11 informing the fact of data transmission of the slave controller 31.

The slave controller 3-1 confirms an interruption flag through SFSCN 5-12, reads the data of control information area 5-1 corresponding to MIRF0 5-10, and resets MIRF0 5-10. A similar sequence is applied to the download/upload buffers A/B 5-2/3 using MIRF1 5-13 and MIRF2 5-14.

It is noted that because that the office data area 54 only sends a notice from the master controller 3-29 to the slave controller 3-1, no interruption is used and a data enable flag(DENF) 5-15 for depicting that the data is effective after a data setting. The slave controller 3-1 scans periodically DENF 5-15 through SFSCN 5-12. When it is effective, the data is used.

In addition, as shown in FIGS. 4 & 5, there is a reset control line 4-30 for making the master controller 3-29 enter into its reset mode in accordance with an input signal (reset signal) from the slave controller 3-1.

Ordinarily, in a normal condition, the master controller 3-29 and the slave controller 3-1 carry out periodically an access to common memory 3-27. However, when the slave controller 3-1 doesn't carry out the access to the common memory 3-27, the slave controller 3-1 decides that the master controller 3-29 is at its abnormal status and submits a reset signal to the master controller 3-29 through the reset control line 4-30 urging the master controller 3-29 to re-start.

As described above, when it is at an abnormal status, it is possible to automatically re-start the master controller 3-29 bringing the controller to its normal status.

The structure of the dealing speech system and the telephone terminal has been described above.

Next, a display operation of the telephone terminal 1-1 and a handling operation of speech control will be described.

Figure 7:
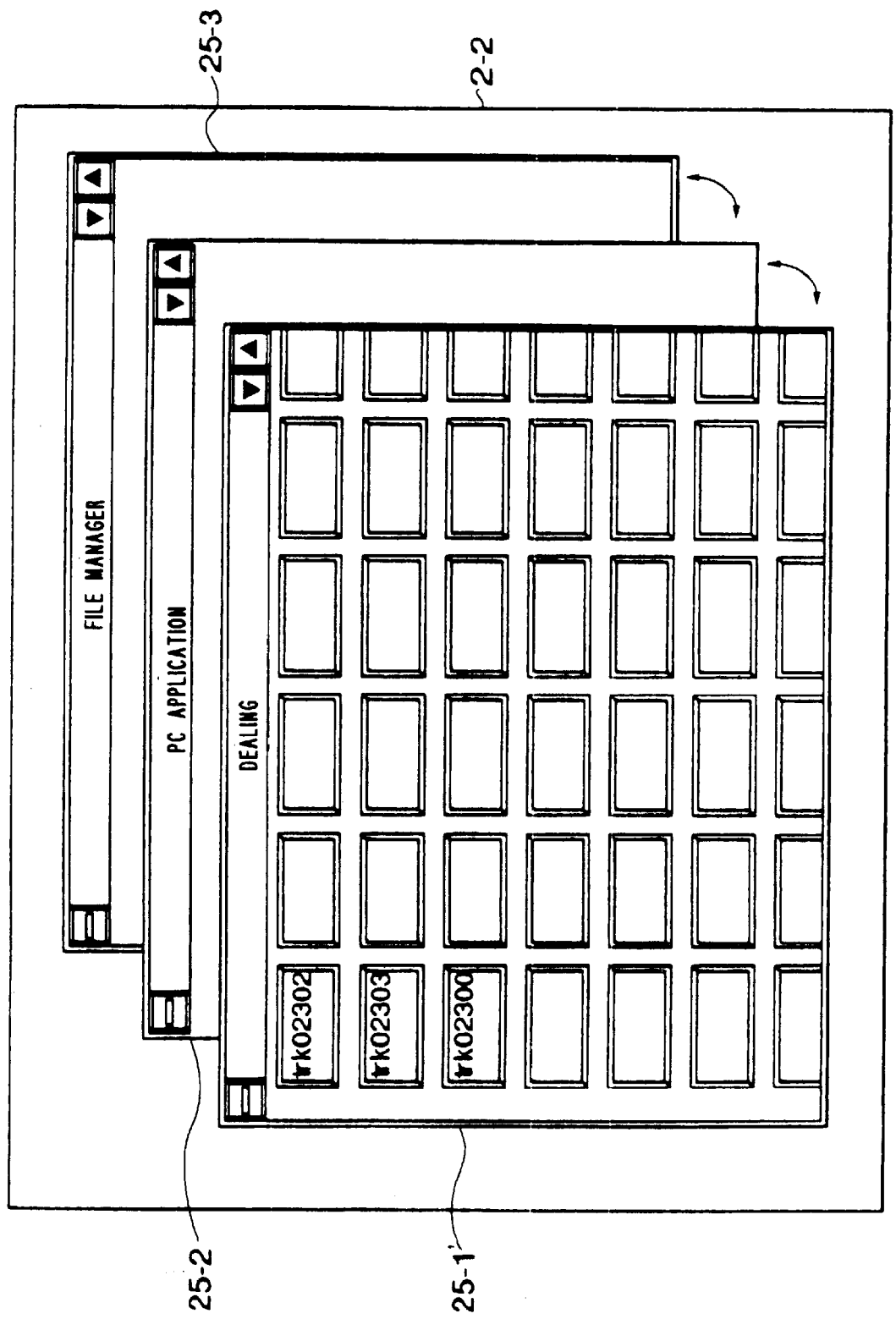
FIG. 7 shows an example of the indication screen displayed by the display of telephone terminal of the embodiment.

FIG. 7 shows an example of display of pagination key 2-2 of the telephone terminal 1-1.

The pagination key 2-2 shown in FIG. 7 has so-called multi window function enabling to show and treat a plurality of screens. So, it is possible to execute a treatment or process of anyone of these windows at its active condition by means of the telephone terminal 1-1. FIG. 7 shows an example depicting a dealing process screen (dealing window) 25-1 providing the telephone function according to the invention, a personal application software screen (PC application window) 25-2, and a personal computer file management screen (file manage window) 25-3.

With reference to all windows, it is possible to display at a full frame, change the screen size, and use icons in the display. These functions are well known and they are not described in detail here.

The pagination key 2-2 of the telephone terminal 1-1 displays as described above a dealing handling display 25-1, so it is possible to execute operations concerning dealing communication connection. A line indication screen used to select and order an outgoing call speech, an incoming call response speech, hold, hold response speech and interruption speech and the like are displayed on the dealing handling screen 25-1, The line indication screen will be described with reference to FIG. 8 depicting a display.

Figure 8:
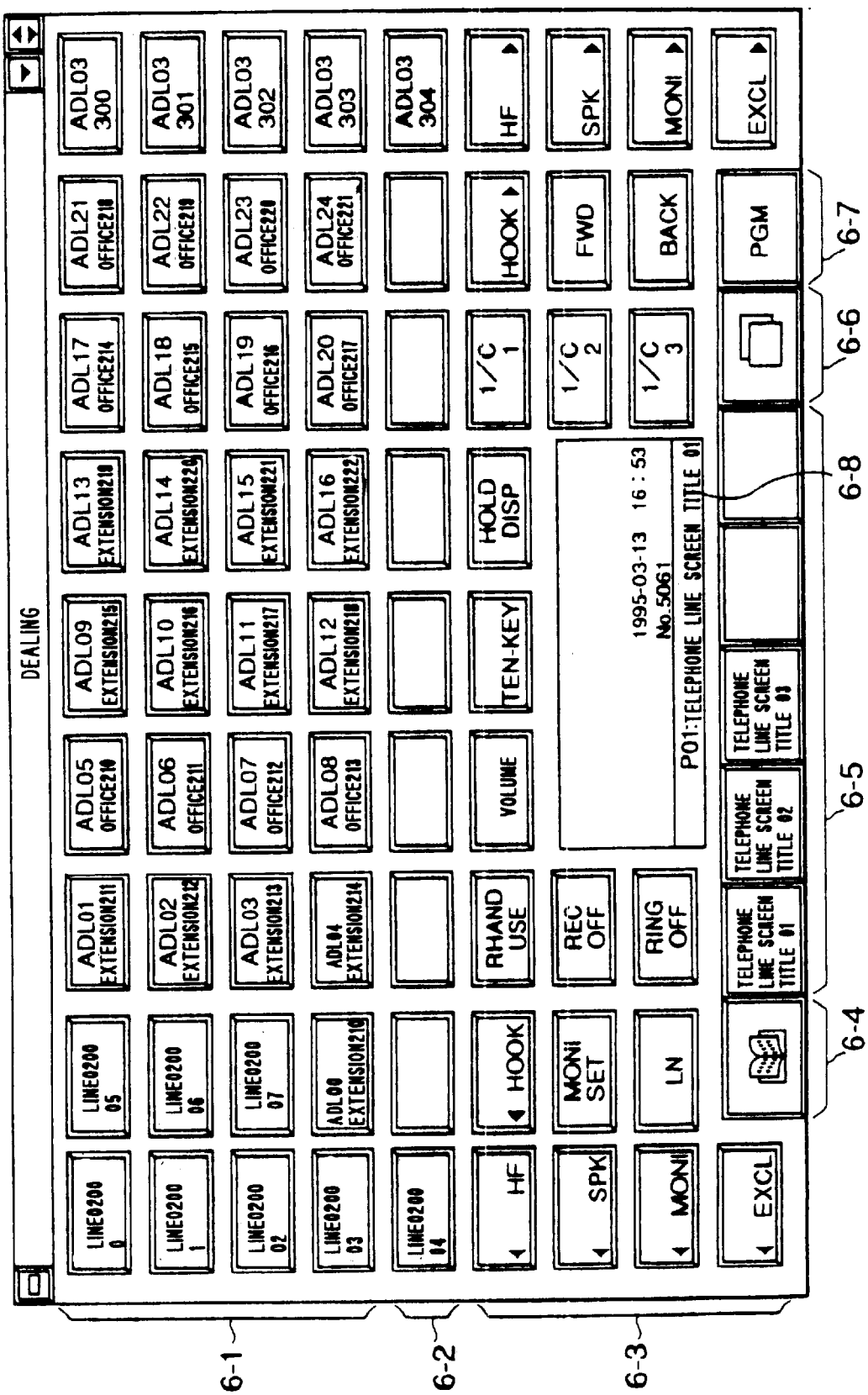
FIG. 8 shows a line indication screen of the telephone terminal according to the embodiment.

On the indication screen shown in FIG. 8, there are many small sequence button-like indication of keys, of which 36 indication keys 6-1 are line keys registering various lines and auto-dials. Of 9 indication keys 6-2, two keys placed at both ends of the horizontal row have the same function as that of line keys 6-1. The remaining indication key of seven are other page call reception indication keys enabling to display call receptions of received line of line indication display other than the current displaying page and other call receptions selected from the received line not registered on any page.

The indication key group 6-3 is of function key and they are divided by the particular functions: HF key is hands-free indication key, SPK key is a speaker speech indication key, MONI key is a monitor indication key, HOOK key is a hooking key, EXCL key is a speech interruption prevention indicator key, MONI SET key is a monitor speakerset key, LN key is a recall demand key, RHAND USE key is right hand set effective key, REC OFF key is a record stop key, RING OFF key is a ringer stop key, SOUNDVOLUME key is a sound volume set key, TEN KEY key is a ten-key (dial key) indication demand key, HOLD DISP key is a hold exclusive screen change key, I/C1 key is a reception exclusive screen I change key, I/C2 key is a reception exclusive screen 2 change key, I/C3 key is a reception exclusive screen 3 change key, FWP key is a display page forward key, and BACK key is a display page back key. Respective key of HF, SPK, MONI and HOOK are set so as to correspond respectively with two left and right handsets.

Figure 9:
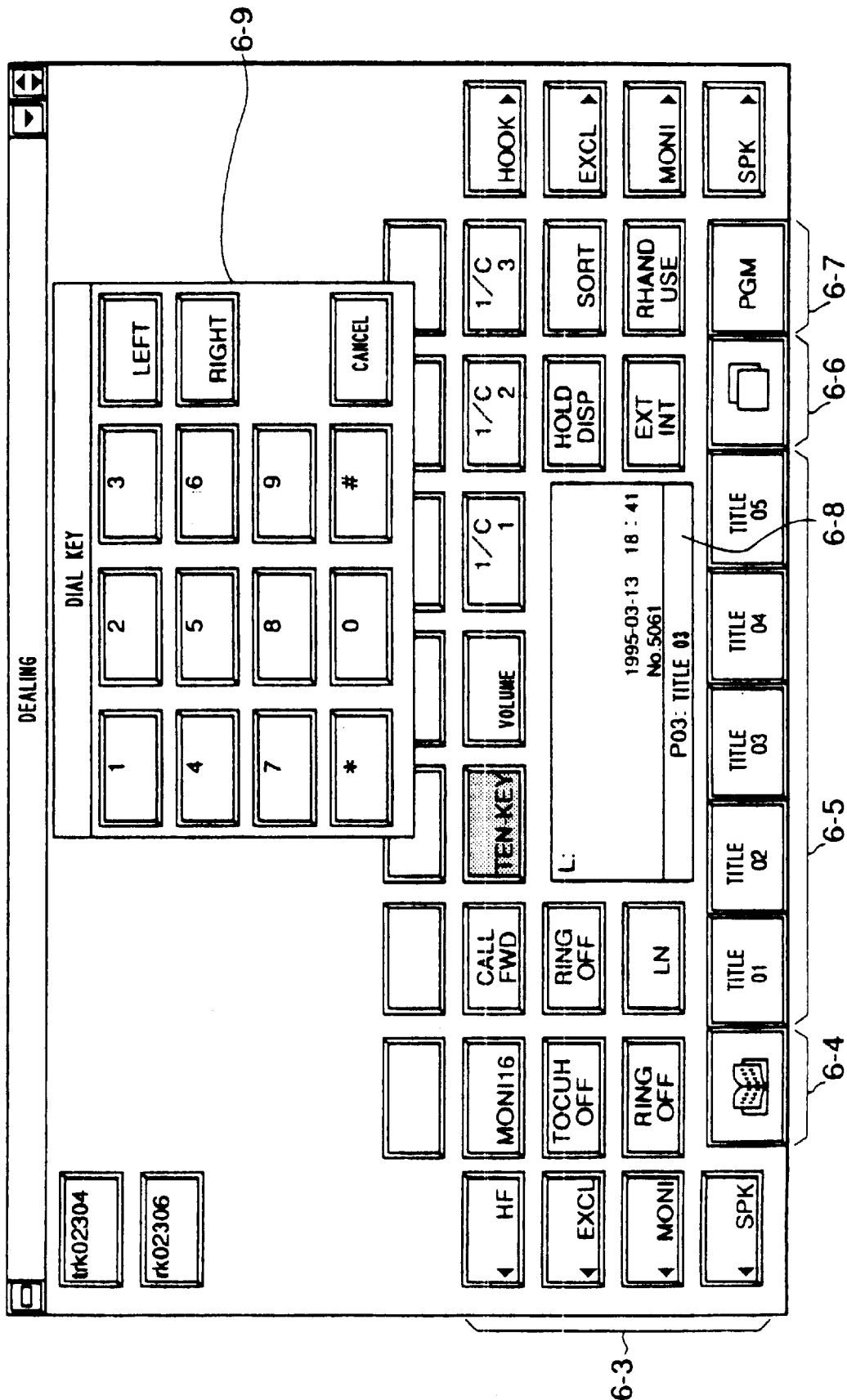
FIG. 9 shows a line indication screen of the telephone terminal of the embodiment.

On the indication display shown in FIG. 9, MONI 16 key is 16 channels monitor set key, TOUCH OFF key is touch recognition stop key of the touch panel, CALL FWD key is a call reception transfer or relay key, EXT INT key is an extension inter-talk key, and SORT key is a line key sorting direction key. Key indication arrangement and functional contents of various function keys can be set at will by data. By re-arranging the contents of data, it is possible to freely set the indication positions and functional contents of each key.

Next, as shown in FIG. 8, the indication key 6-4 is an index screen change key described above, the indication keys 6-5 are line screen direct change key, indication key 6-5 is a screen title change key for sequentially changing the indication keys 6-5, and indication key 6-7 is a data set display change key.

Indication space 6-8 is an information indicator displaying contents of dialling, remote data and remote name. When it is not used, the data, time and number of telephone terminal shown in FIG. 8 are displayed. The current screen page and title of the name and the like are displayed at the bottom as shown.

FIG. 9 is an indication screen after a line call transmission while Page 3 of line indication screen is displayed. FIG. 9 shows that TEN-KEY key is pushed down and the dial key window 6-9 is indicated. Then an operator pushes down the dial key dialing remote subscriber number, then a call transmission starts on the line of dialed number.

This telephone terminal employs the system failing to indicate a line key 6-1 on a line indication screen with reference to data non-registered line. Therefore, when data of respective lines are set every other one when data is set, line key 6-1 will be displayed on the line indication screen every other one widening the distance between the line keys 6-1, and it is sure to prevent erroneous operation of line keys 6-1 by the operator.

Figure 10:
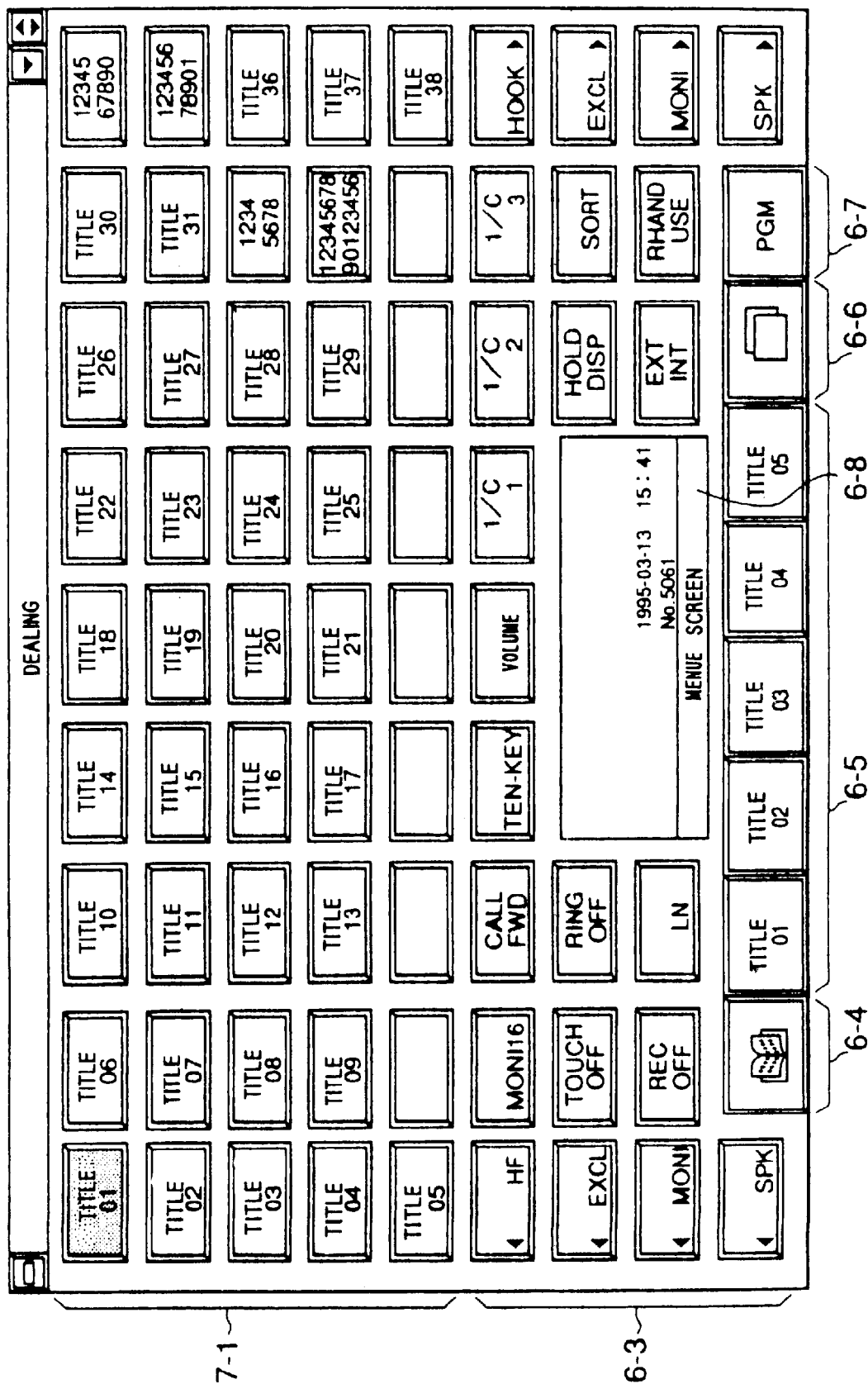
FIG. 10 shows an index indication screen of the telephone terminal of the embodiment.

When the index screen change key 6-4 on line indication screen shown in FIG. 8 is operated, the screen changes to the index indication screen shown in FIG. 10. The index indication screen will be explained.

The index indication screen shown in FIG. 10 is a page screen enabling to change the line indication screen by one-touch operation. The indication key arrangement in the display is the same as that of line indication screen (FIG. 8). The indication key corresponding to a line key in line indication screen on the index indication screen is line indication screen change key 7-1 enabling to change the pages to page 38 according to the embodiment of the invention.

The name indicated in the line screen change key 7-1 is able to set at will according to the data and the registered name is indicated as a page name in an information indicator 6-8 of the line indication screen shown in FIG. 8.

Index screen change key 6-6 in the index indication screen is pushed down or touched, then the page returns to the display page before an index indication screen is changed.

Next, the call reception exclusive screen shown by touching the call reception exclusive screen change key of the functional keys will be explained with reference to FIG. 11.

Figure 11:
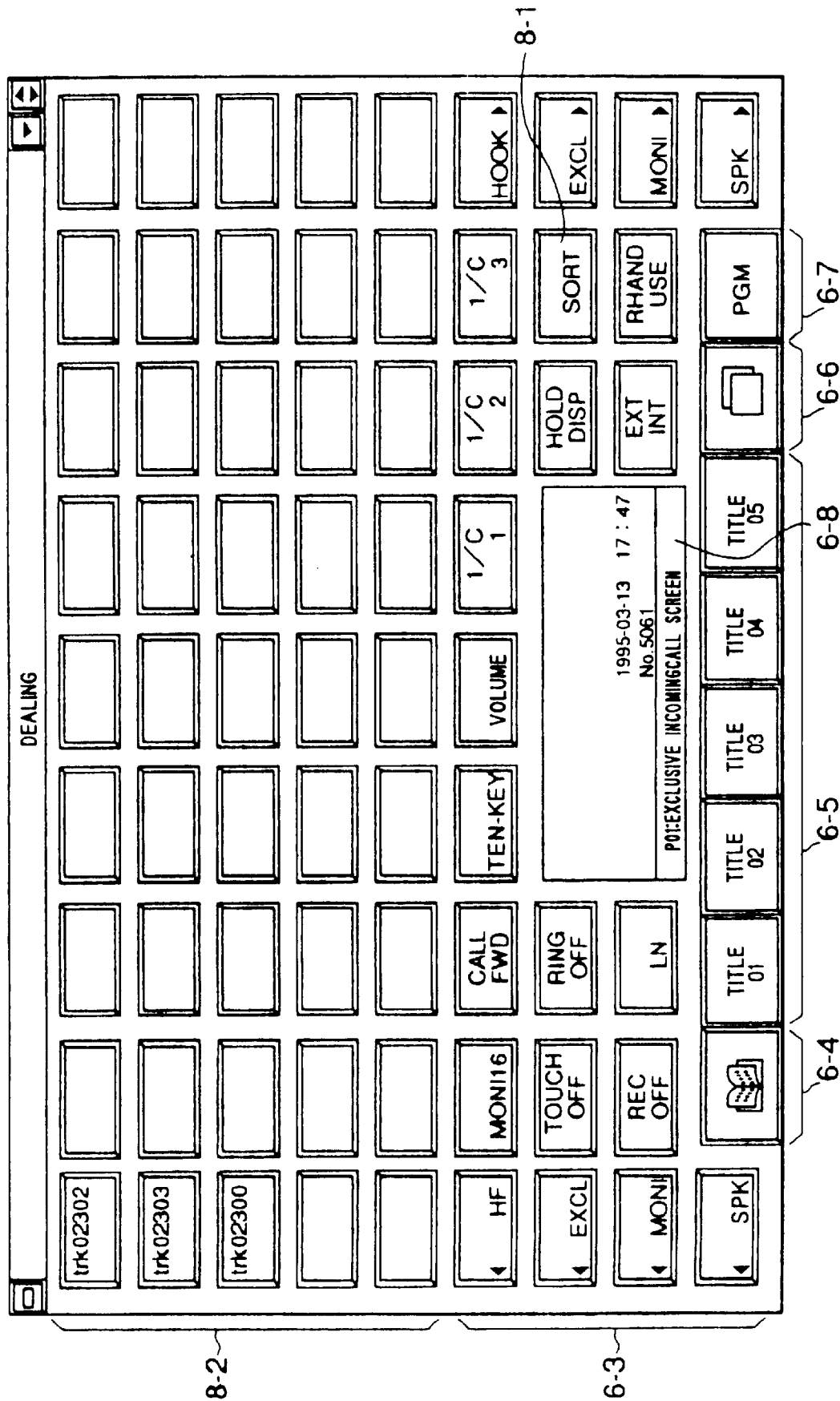
FIG. 11 is an incoming call exclusive screen of the telephone terminal of the embodiment of the invention.

The indication key arrangement in the call reception exclusive screen shown in FIG. 11 is identical with that of the line indication screen (FIG. 8). The indication keys corresponding to the line key in the line indication screen are the line indication keys 8-2 during a call reception on the call reception exclusive screen and these indication keys 8-2 indicate sequentially from the upper left one in order of reception.

In addition, when you touch the receiving line indication key 8-2 displaying the call reception exclusive screen, the line is responded and the line becomes not receiving status, so the receiving line indicator key 8-2 displaying the call reception exclusive screen disappears.

Accordingly, if any person other than the operator in charge (other telephone terminal) responds to the line during a call reception, it is necessary to make the receiving line indication key 8-2 disappear from the call reception exclusive screen. However, in case that, when such third person responds, the receiving line indication key 8-2 is made to disappear from the call reception exclusive screen and also, in order to wipe out a vacant space of the receiving line indicator key 8-2, other indicator key 8-2 is sorted, erroneous response may happen when you are responding and other person's responding are executed simultaneously.

In order to solve such problems, telephone terminal 1-1 makes the call receiving line indication key 8-2 corresponding to the responded and receiving line only disappear from the call reception exclusive screen and doesn't sort the receiving line indication key 8-2, so that it is possible to strongly prevent any erroneous response even if your responding operation and the other person's responding operation are executed simultaneously.

Also, as described above, call reception and transmission are repeated and thus vacant spaces increase gradually in the reception exclusive display. Therefore, it is possible to wipe out the vacant space by replacing the vacant space in the reception exclusive display of disappeared receiving indication line key 8-2 with other receiving line indication key 8-2 by using SORT key 8-1.

There are three screens of reception exclusive display. Each screen indicates, by means of keys, all call receptions in bulk, which receptions are contained in the line key of telephone terminal 1-1, or only the receiving line appointed by data, or call receptions of the line concerning the particular line kind, or a combination of the above. These indications in the display are selected at will and set according to data.

Figure 12:
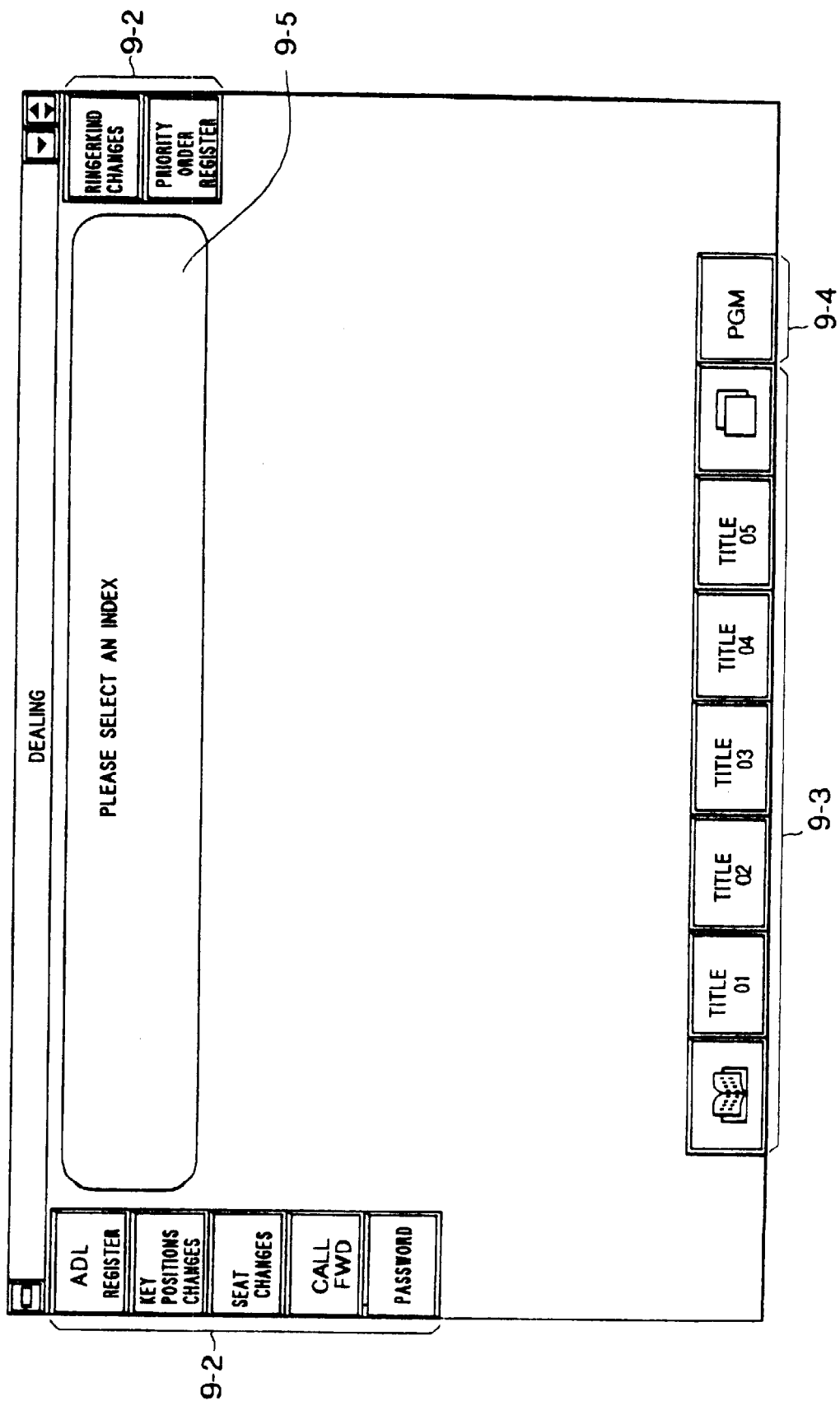
FIG. 12 is an user program mode screen of the telephone terminal of the embodiment.

When you touch the data setting screen change key (PMG key) 6-7 displayed in the line indication screen shown in FIG. 8, a user program mode screen shown in FIG. 12 is obtained.

The user program mode screen will be explained with reference to FIG. 12. As shown in FIG. 12, indication keys 9-1 and 9-2 are for function selecting, ADL register key is for demanding one-touch auto-dialing registration described later, Key Position Change key is for demanding position change of various keys, Terminal Change key is for demanding terminal change function of the data of the current telephone terminal to that of third person's telephone terminal, CALL FWD key is for demanding the call reception relaying registration, Pass Word key is for demanding a password set when the system starts, Ringer Kind Change key is for demanding a set change of ringer sound when line call received, and Priority Order Registration key is for demanding a catched line order set function when auto-dialing call is transmitted.

The indication key group 9-3 has an identical function as that of line indication screen, and the key 9-4 has a function for demanding a return to the display previous to the user program mode screen. A region 9-5 is an indicator of explanation of various items and set data.

When the user program mode screen shown in FIG. 12 is displayed, you touch ADL Register key and this indication screen changes to line indication screen shown in FIG. 8. Then, one key of line keys 6-1 in line indication screen is selected obtaining the one-touch auto-dialing registration screen shown in FIG. 13. Thus, it is possible to set the auto-dial-registration of the selected line key. The one-touch auto-dialing registration screen will be explained as follows.

Figure 13:
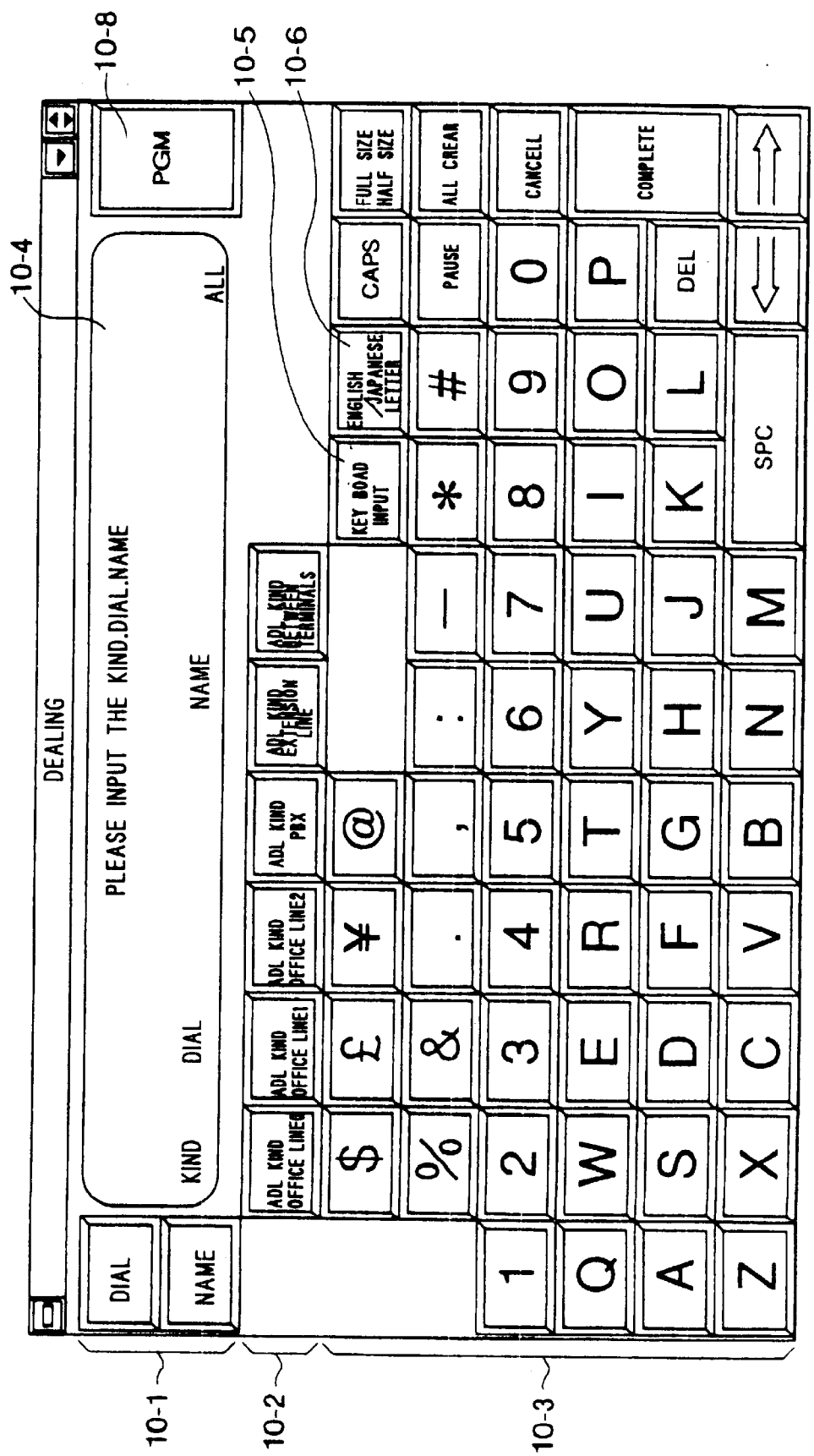
FIG. 13 is an one-touch auto-dial register screen of the telephone terminal of the embodiment.

In the one-touch auto-dialing registration screen shown in FIG. 13, two indication keys 10-1 are for changing the registered contents, Dial key is for demanding or urging change of dial number, and Name is a key for demanding a change of name indicated. The indication key group 10-2 are keys for appointing an Auto-dial kind and they are Office 0 key, Office 1 key, Office 2 key, PBX key, Extension key and Between terminal key.

An auto-dialing registration is done according to a procedure shown in and guided by the indicator 10-4. That is, auto-dial kind, dialing and name are inputted through a keyboard 10-3. It is noted that a Keyboard Input key 10-5 is not included in the keyboard 10-3 and the Input key 10-5 is for demanding an input change when an outer keyboard of common type is connected thereto. When you touch the Keyboard Input key 10-5, it becomes possible to input information through the outer keyboard.

English Letter Japanese Letter key 10-6 is adapted to change the mode of input when you input information through the keyboard 10-3 in accordance with the order of English letter, Japanese Hirangana letter and Japanese Katakana letter. PGM key 10-8 is a function key for demanding a return of a display to the display previous to the user program mode screen.

Next, PCCPU program for controlling the master controller (PCCPU) 3-29 and a start sequence of LTCNT program for controlling the slave controller (LTCNT) 3-1 will be described with reference to FIG. 14.

Figure 14:
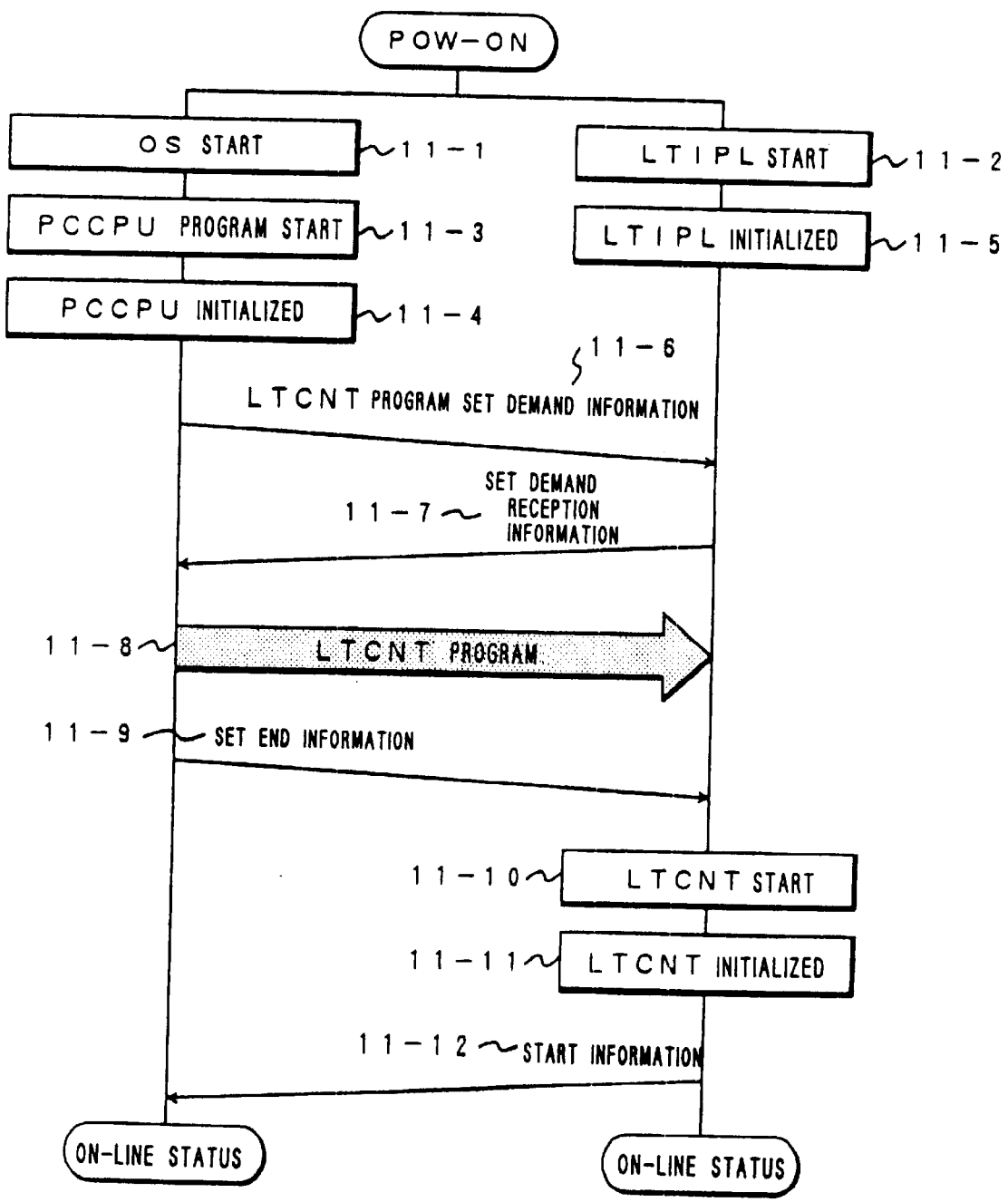
FIG. 14 is a view showing a starting sequence of the telephone terminal of the embodiment.

As shown in FIG. 14, after enabling the power source of the telephone terminal 1-1, master controller 3-29 starts its function in a sequence identical with that of common personal computers resulting in a start of the Operation System (OS) (Step 11-1).

Simultaneously, the slave controller 3-1 starts an operation of IPL program stored in IPL ROM 3-23 of non-volatile memory (Step 11-2). IPL program is for loading LTCNT program controlling slave controller 3-1 and a detailed explanation of the IPL program will be done. The LTCNT program is stored in a hard disc controlled by master controller 3-29 in order to make a maintenance of programs easy.

PCCPU program automatically starts a control of the master controller 3-29 after the OS starts at Step 11-1 (Step 11-3). This start operation is done under a batch handling previously set. Then, according to the PCCPU program, a main memory (RAM) 4-9 and others are initialized (Step 11-4).

Meanwhile, the slave controller 3-1 initializes volatile RAM memory 3-24 and a hardware for setting LTCNT program under a control of IPL program in order to prepare for call reception start of LTCNT program.

Next, the master controller 3-29 transmits LTCNT program Set Demand Information through PC interface 3-28 connected to ISA bus connector 4-12 and a common memory (DPRAM) 3-27 (Step 11-6). With receiving a set demand information, the slave controller 3-1 transmits Set Demand Reception Information responding to the set demand information to the master controller 3-29 through the common memory (DPRAM) 3-27, the PC interface 3-28 and ISA bus connector 4-12 (Step 11-7).

With a reception of Set Demand Reception Information, the master controller 3-29 transmits LTCNT program stored in the hard disc 2-30 to the slave controller 3-1 (Step 11-8). After the transmission, the master controller 3-29 transmits a Set End Information to the slave controller 3-1 (Step 11-9).

Next, after the slave controller 3-1 receiving the LTCNT program, the slave controller 3-1 sets the LTCNT program in the RAM 3-24. With a reception of the Set End Information, the slave controller 3-1 makes the LTCNT program in the RAM 3-24 start (Step 11-10). Next, this slave controller 3-1 initializes a hardware for On-line or RAM 3-24 on the basis of the process of the LTCNT program (Step 11-11). The slave controller 3-1 transmits a Start Information to the master controller 3-29 (Step 11-12) and an On-line status is obtained.

Also, the master controller 3-29 receives Start information and on-line status is obtained, thus the whole telephone terminal 1-1 starts its function.

Next, indication forms of LEDs 2-51 and 2-61 installed correspondingly to Extension 1 key 2-50 and Extension 2 key 2-60 of the extension key 2-21 shown in FIG. 3 will be described with reference to FIGS. 15(*a*)–15(*d*).

When extensions corresponding to Extension 1 key 2-50 and Extension 2 key 2-60 are at their vacant conditions, LEDs 2-51 and 2-61 are lit off as shown in FIG. 15(*a*). When these extensions are busy, LEDs 2-51 and 2-61 are lit on as shown in FIG. 15(*b*).

When these extension are held, LEDs 2-51 and 2-61 turn on and off in green and orange colors as shown in FIG. 15(*c*). When these extension are of call receiving status, LEDs 2-51 and 2-61 of red color turn on and off.

In order to recognize, when these extension are busy or held, whether the receiving call is of the left handset 3-21 or the right handset 3-21, green is indicated when a left handset is used and orange when a right handset is used.

Next, indication form of the line key 6-1 displayed in the pagination key 2-2 shown in FIG. 8 will be explained with reference to FIGS. 16(*a*)–16(*i*).

First, when the line corresponding to the line key 6-1 is of vacant status, only a key frame is indicated as shown in FIG. 16(*a*), and when the line is busy through your own terminal, a green or orange bar is indicated at the upper portion of the key frame as shown in FIG. 16(*b*). When the line is busy through other terminal, a blue bar is shown at the upper portion of the key frame. When the line is receiving a call, the frame upper portion displays a rapid on and off of red color.

When the line is held on your own terminal, the frame upper portion indicates a slow on and off of green or orange color as shown in FIG. 16(*e*). When line is held on other terminal, the upper portion displays a slow on and off of blue light as shown in FIG. 16(*f*). Also, when your own terminal is automatically transmitting a call, the frame upper portion shows a green or orange bar as shown in FIG. 16(*g*),.

Furthermore, when your own terminal is monitoring a broker line through a speaker, the line key 6-1 has a background of red and the letter in the key is indicated in yellow, as seen in FIG. 16(*h*). When other terminal is monitoring, the line key 6-1 has a background of yellow and the letter of red is shown in the key, as seen in FIG. 16(*i*).

When your own terminal is busy and your own terminal holds an extension, you can recognize that the call is of the left handset 3-21 or of the right handset 3-21 by seeing a green indication of left handset or an orange indication of right handset.

Figure 17:
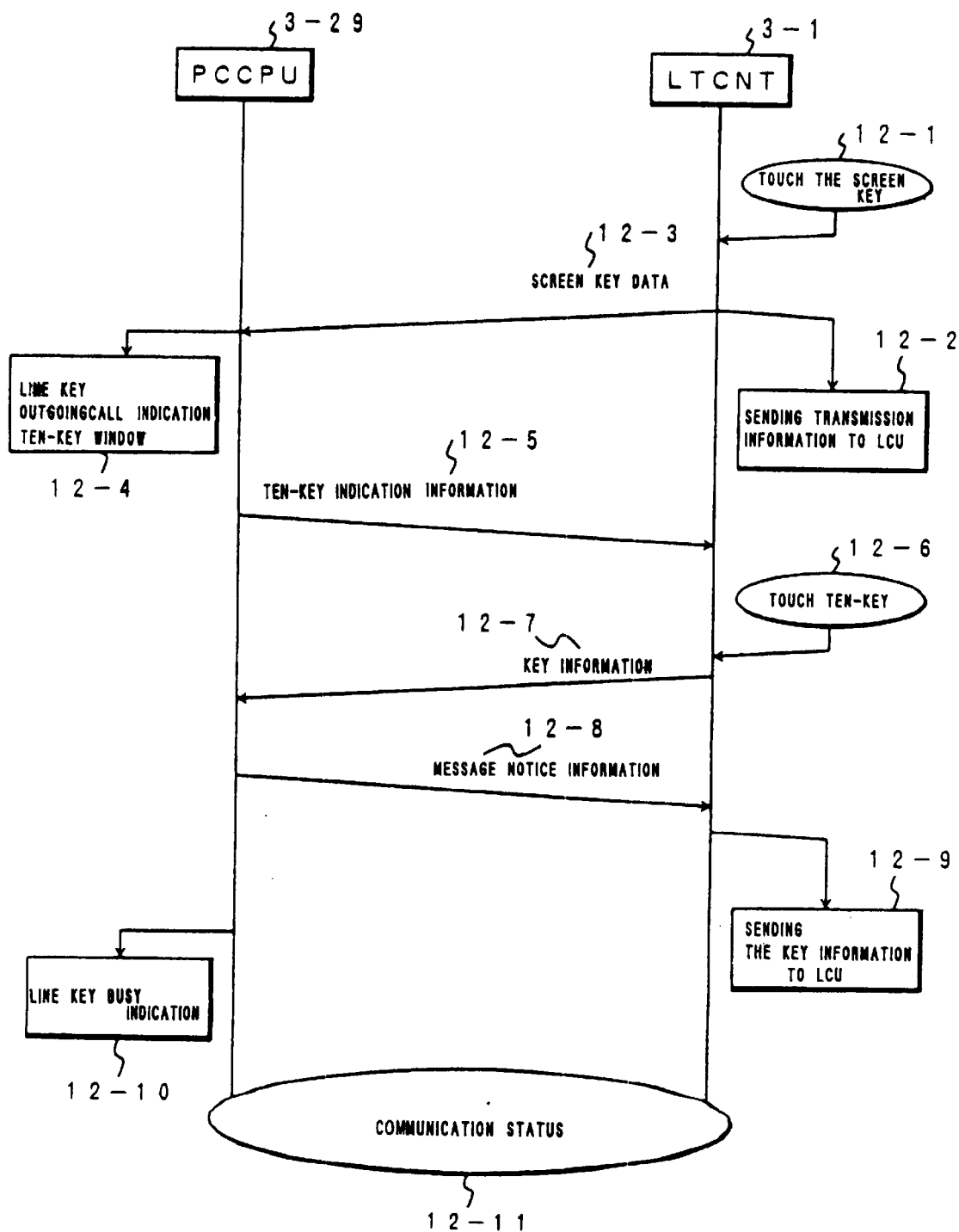
FIG. 17 shows a control sequence of a line outgoing call of the telephone terminal according to the embodiment.

Next, a control sequence of line call transmission through the telephone terminal 1-1 will be explained with reference to FIG. 17.

When the master controller 3-29 displays the line indication key 6-1 shown in FIG. 8 in the pagination key 2-2 and the operator touches the line key 6-1 on the screen (Step 12-1), the slave controller 3-1 recognizes the touched position by a touch panel 3-31 and the touch controller 3-26, finds a display information described later from the touched position, and knows the contents of line key 6-1.

The slave controller 3-1 searches the current usage condition of the telephone terminal 1-1 and the line. If the slave controller 3-1 finds that the usage condition permits a line call transmission from the search result, the slave controller sends Transmission Information (Outgoing call Information) to the line controller (LCU) 1-2 (Step 12-2). With receiving the Transmission Information, the line controller 1-2 catches the line corresponding to or concerning Transmission Information.

The slave controller 3-1 sends Transmission Information to the line controller 1-2 as well as informs of Screen Key Data corresponding to the Transmission Information to the master controller 3-29 (Step 12-3). The Screen Key Data contains line key position information of a result of analysis and judgement of the call transmission operation, and information of the handset 3-2, which is used to transmit the information ,is of a left side or a right side.

As described above, the slave controller 3-1 side of the telephone terminal 1-1 has conversation control function in order to directly transmit Transmission Information from this slave controller 3-1 to the line controller 1-2, thereby shortening line catching time. When it is not necessary to shorten the line catching time, the slave controller 3-29 informs of a touch position to the master controller 3-29, the master controller 3-29 analyzes a position and contents of line key 6-1 and judges line transmission condition in order to transmit Transmission Information to the line controller 1-2. Such control procedure is very easy.

Also, when the master controller 3-29 receives Screen Key Data in Step 12-3, the controller controls a call transmission indication of line key 6-1 in indication form shown in FIGS. 16(*a*)–16(*i*), which line key being touched in Step 12-1 and corresponding to Screen Key Data, according to the information contained in Screen Key Data, as well as automatically displays a ten-key window 6-9 shown in FIG. 9 on pagination key 2-2, if the line key 6-1 corresponding to Screen Key Data is a line necessitating a dial input, according to the information contained in Screen Key Data (Step 12-4).

The master controller 3-29 indicates a ten-key window 6-9, as well as informs of this status as Ten-key Information to the slave controller 3-1 (Step 12-5). Ten-key Information contains the position indicated in the display indicating ten-key window 6-9 and ten-key position information.

Next, when the operator touches the ten-key on the ten-key window 6-9 in order to input a dial number (Step 12-6), the slave controller 3-1 recognizes through the touch panel 3-31 and the touch controller 3-26 and sends Key Information (dial number) of the key corresponding to the recognized touch position to the master controller (Step 12-7).

Receiving the key information, the master controller 3-29 monitors (indicates) the dial number in the dial indicator (part of information indicator 6-8) of the line indication screen shown in pagination key 2-2 based on the key information, as well as transmits a message (key information and the like) to be sent to the line controller 1-2 to the slave controller 3-1 through the Message Notice Information (Step 12-8). Also, when the Message Notice Information is received, the slave controller 3-1 transmits key information contained in this Message Notice Information to the line controller 1-2 (Step 12-9).

The master controller 3-29 changes the indication of line key 6-1 corresponding to the line to the indication that your terminal is busy in the indication form shown in FIG. 16(b) after it transmits Message Notice Information to the slave controller (Step 12-10).

After the procedure above is done, a line call transmission operation has been executed and the line controller 1-2 sets a speech channel establishing a communication status between the telephone terminal 1-1 and other terminal at remote side (Step 12-11).

Figure 18:
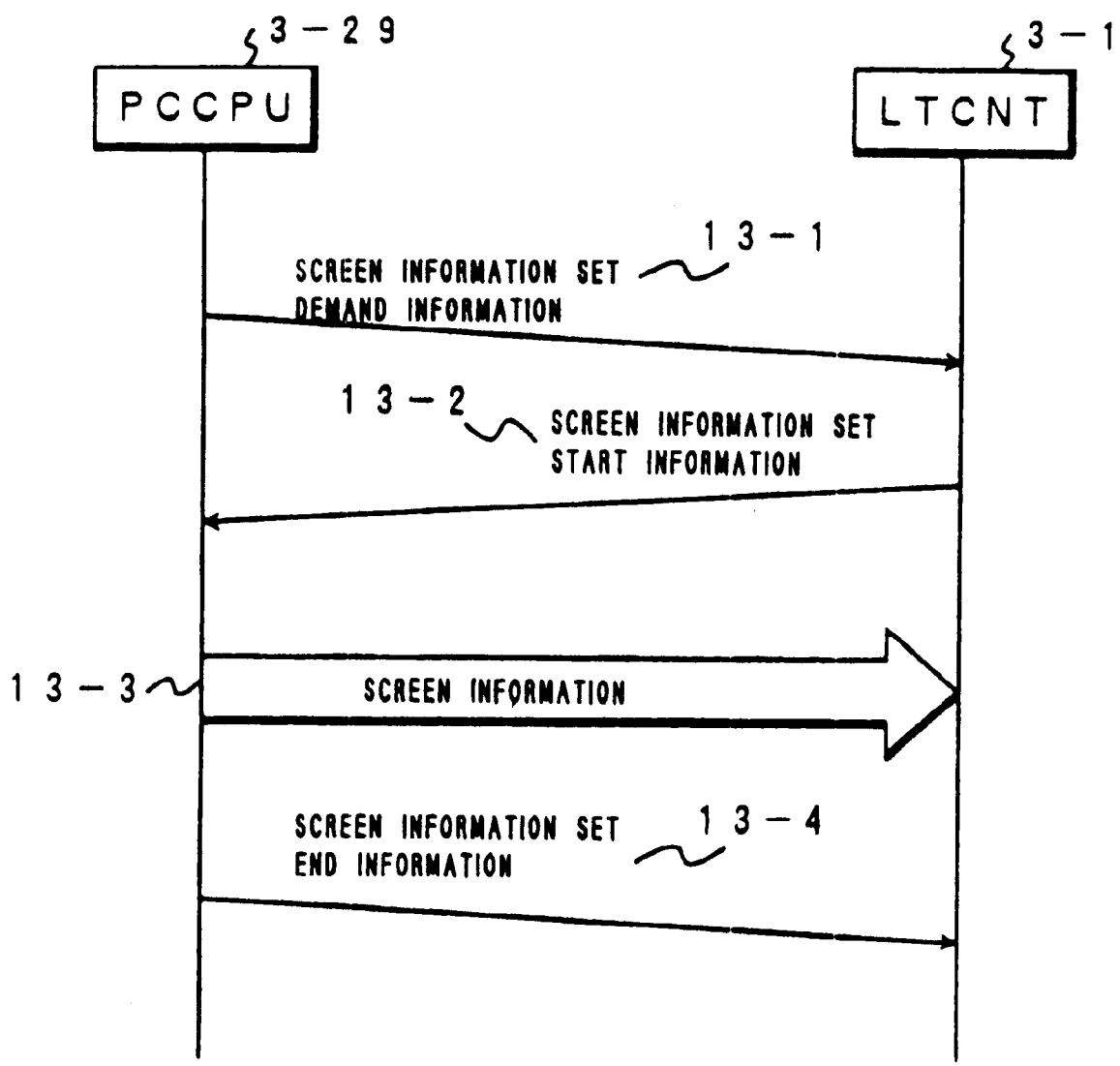
FIG. 18 shows a control sequence for displaying information setting of the telephone terminal of the embodiment.

Next, a control sequence depicting the display information set procedure will be explained with reference to FIG. 18.

The slave controller 3-1 of the telephone terminal 1-1 transmits Transmission Information to the line controller 1-2, so it is necessary to previously inform of line information (display information) corresponding to respective line keys 6-1 on pagination key 2-2 to the slave controller 3-1.

Then, the master controller 3-29 successively transmits Screen Information Set Demand Information to the slave controller 3-1 when the master controller 3-29 starts its operation and the pagination key 2-2 changes the page (Step 13-1).

As described above, the reason for the Screen Information Set Demand Information being sent from the master controller 3-29 to the slave controller 3-1 is to prevent line information from being rewritten one-sidedly at a side of the slave controller 3-1 during the time the operator touches keys on the touch panel 3-31 (pagination 2-2) through the time a key information concerning the keys is transmitted to the master controller 3-29.

The slave controller 3-1 judges whether some problems happen or not if line information corresponding to the key in relation to the key information is rewritten after the slave controller 3-1 receives Screen Information Set Demand Information. When no-trouble is judged or determined, the slave controller 3-1 sends Screen Information Set Start Information to the master controller 3-29 (Step 13-2), as well as keeps a touch of line key 6-1 at non-effective until Screen information set is completed.

Because that a set of such screen information is executed by the common memory 3-27 between the master controller 3-29 and the slave controller 3-1, touch invalidity time becomes very short. Additionally, because that it is before that the name indication of line key 6-1 is determined through screen rewritten handling of the pagination 2-2, the operative convenience of the operator is not deteriorated nevertheless there is touch invalidity time.

Next, with receiving Screen Information Set Start Information at Step 13-2, the master controller 3-29 transmits Screen Information showing screen contents indicated in pagination key 2-2 to the slave controller 3-1(Step 13-3). After all screen information is sent, Screen Information Set Completion Information depicting an end of sending is noticed to the slave controller 3-1 (Step 13-4). Noteworthy, the slave controller 3-1 makes again the touch of slave controller 3-1 effective after it receives the screen Information Set Completion Information.

Therefore, because that telephone terminal 1-1 changes the page of pagination key 2-2 and starts its operation, and screen information containing line information successively is sent from the master controller 3-29 to the slave controller 3-1, the slave controller 3-1 stores the information corresponding to each line key 6-1 in the pagination key 2-2.

Figure 19:
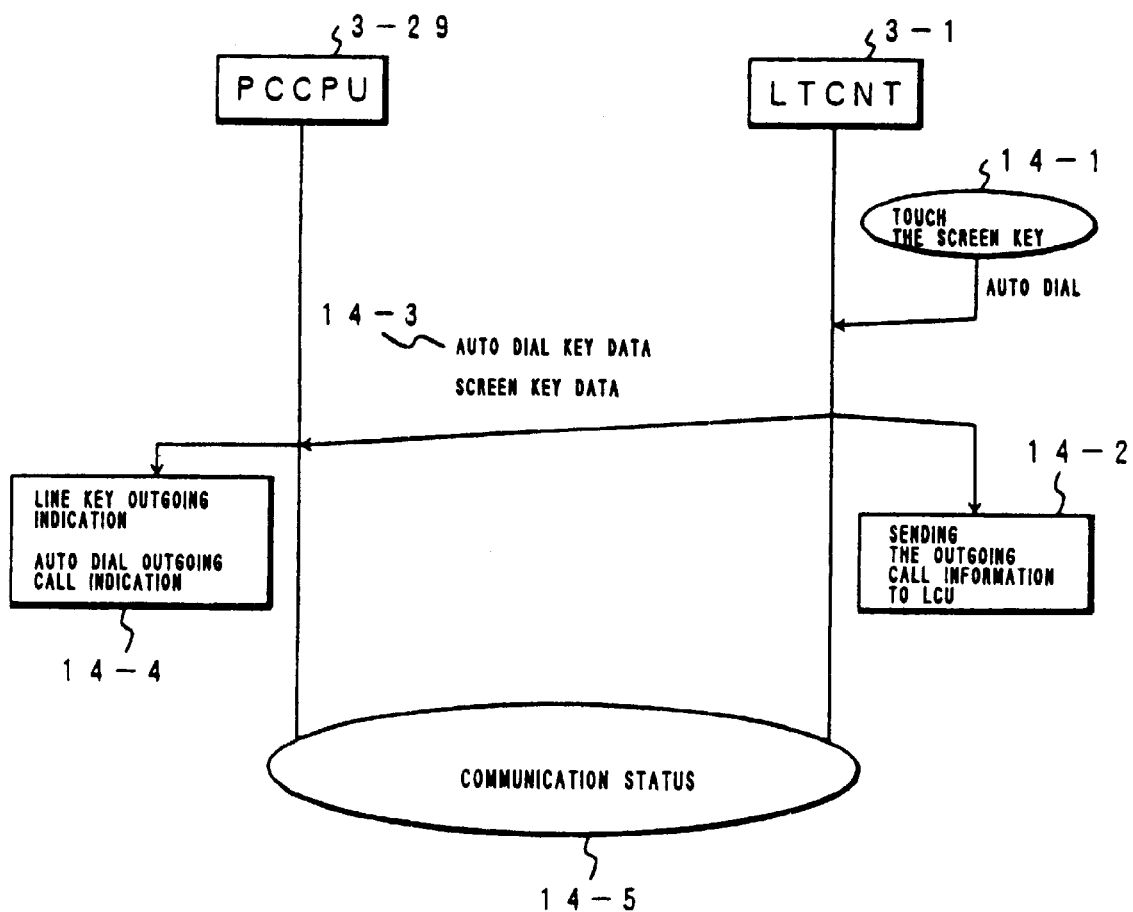
FIG. 19 depicts a control sequence obtained when the auto-dial keys of the telephone terminal of the embodiment are touched.

Next, the control sequence to be executed when line indication screen shown in FIG. 8 is indicated in pagination key 2-2 and the operator touches an auto-dial key will be explained with reference to FIG. 19.

When the master controller 3-29 indicates the line indication screen shown in FIG. 8 on pagination key 2-2 and the operator touches ADL key (auto-dial key) of the line keys 6-1 recognizes the touch position of ADL key through the touch panel 3-31 and the touch controller 3-26, searches screen information set by the set procedure with reference to the touch position, and knows the contents of ADL key on the base of screen information.

The contents of ADL key is only dial information to be transmitted. Consequently, in case that auto-dial call transmission operation is to be executed by ADL key, it is necessary to set information concerning the line to be transmitted on the common memory different from the screen information at every telephone terminal 1-1.

It is because that the lines are allotted to every operator of the telephone terminal 1-1. The reason for such allotment will be simply explained. According to the system of the embodiment of the invention, different from the conventional method of transmission through search line way (automatically catching non-used line function) of line controller 1-2, the telephone terminal 1-1 to receive a call is specified according to the transmission subscriber number obtained at the time of reception in order to directly call up the telephone terminal 1-1. However, if an unused line is used at random to transmit a call, certain transmission may use the line to be used by a call reception of other telephone terminal resulting in a false busy sound of the line to receive and failing to receive the line.

According to the invention, in order to prevent the operator from failing to receive a call because he or she receives a busy signal while any call is not communicated, the line is allotted for every telephone terminal executing call transmission and reception.

Consequently, when the ADL key is used to execute auto-dial call transmission, the slave controller 3-1 judges line usage condition set on every telephone terminal 1-1 and usage status of the current telephone terminal after slave controller 3-1 detects a touch of the ADL key. When line call transmission can be done, Transmission Information (Outgoing call Information) is sent to a line information controller 1-2 (Step 14-2), as well as information corresponding to the touched ADL key, Screen Key Data, and Auto-dial Key Data are sent to the master controller 3-29 (Step 14-3).

The Screen Key Data contains, similar to that of the line transmission previously described, line key position information of the result of operation analysis and judgement, and information of side of the transmitted handset 3-21 of left and right.

Here, the purpose of making slave controller 3-1 have a control function in order to send transmission information to the line controller 1-2 is identical with that of the line call transmission.

On the other hand, when the master controller 3-29 receives Screen Key Data and Auto-dial Key Data, the controller transmits ADL key touched in the step 14-1 and indicates it in a form shown in FIG. 16(g) in accordance with the screen data. And the master controller 3-29 executes, on the basis of the auto-dial key data, an indication-of-use (for example, change of indication form) of the touched ADL key and an indication of dial contents transmitted to the dial indicator (part of information indicator 6-8)(Step 14-4).

Thus, a line call transmission operation has been done, and a set communication channel through the line controller 1-2 has established a conversation status between the telephone terminal 1-1 and a remote terminal (Step 14-5). Next, a call reception sequence obtained when a call from line is received at line controller 1-2 will be explained with reference to FIG. 20.

As described above, the lines have been allotted for every telephone terminal 1-1 so as to make the telephone terminal 1-1 of the operator in charge of the receiving call of the general line to directly receive. Disadvantageously, executing a management of everyone of a lot of telephone terminal 1-1 at a side of line controller 1-2 burdens the proper line controller 1-2 in its operation. According to the system of the invention, the telephone terminal 1-1 is adapted to execute respectively its own line management in order to solve the problem of the prior art mentioned above.

Figure 20:
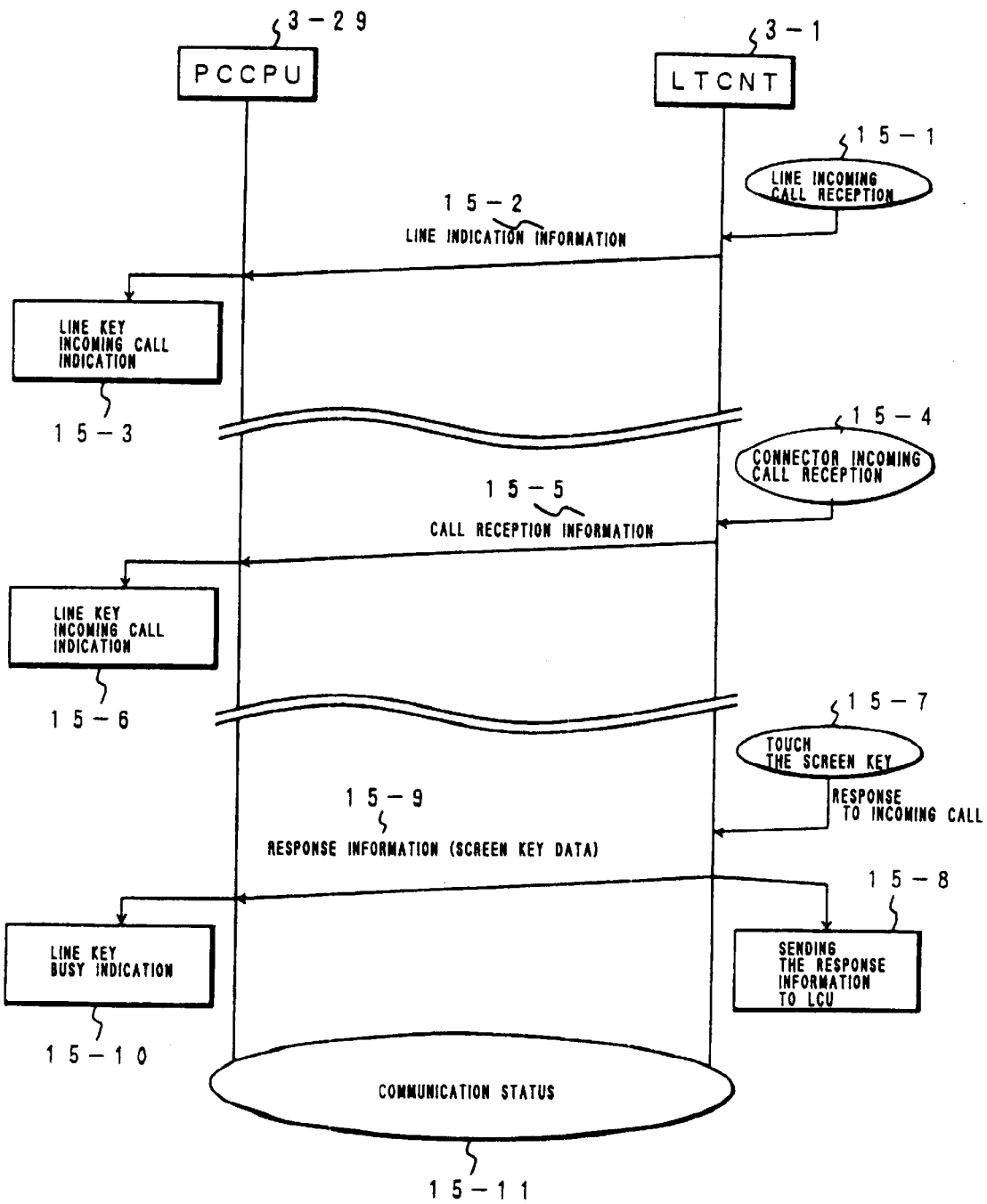
FIG. 20 shows a control sequence of a line incoming call and a response to the incoming call in the telephone terminal according to the embodiment.

As shown in FIG. 20, a central controller(software) 1-20 of a line controller or line control unit(LCU)1-2 informs all digital telephone terminal line (DBDLIN) of Call Reception Information of line after it detects call reception of the containment line, and the slave controller 3-1 of each telephone terminal 1-1 recognizes a call reception of the line (Step 15-1). It is noted that these digital telephone terminal line circuit 1-3 are adapted to send the Call Reception Information as a line information to all telephone terminals 1-1 through a hardware control.

Next, when slave controller 3-1 of each telephone terminal 1-1 recognizes a call reception of line at the step 15-1, the slave controller judges that the receiving line (line concerning the received information) is or isn't the line accommodated in your terminal (line to be handled). In case that the receiving line is judge to be handled, the slave controller 3-1 sends Line Indication Information to the master controller (Step 15-2).

The master controller 3-29 recognizes a control objective line on the basis of the received Line Information and recognizes that this line is an incoming call, displaying the line key 6-1 of the pagination key 2-2 corresponding to this line as shown in FIG. 16 (Step 15-3).

In addition, when the central controller(software) 1-20 of the line controller or line control unit (LCU) 1-2 detects a terminal reception directly appointing an extension terminal of line control unit (LCU) whose representative is dial-in service, the central control unit sends Call Reception Information to the receiving telephone terminal through the digital telephone terminal circuits (DBDLIN) 1-3. The slave controller 3-1 of the telephone terminal 1-1 recognizes, after it receives its Call Reception Information (Step 15-4), that it is a terminal reception because a call is received in only one telephone terminal, and informs of Call Reception Information to the master controller 3-29 in order to sort out the kind of call reception (Step 15-5). The master controller 3-29 knows that there is a call reception on your telephone terminal because of the receive Reception Information , and then identifies the line received.

The master controller 3-29 indicates that a call is receiving on the line key 6-1 corresponding to the pagination key 2-2 in a form shown in FIG. 16(d)(Step 15-6).

Touching or pushing down the line key 6-1 on line indication screen (pagination key 2-2) of the telephone terminal 1-1 responds to the receiving line. The responding sequence for the receiving line will be explained.

When the master controller 3-29 indicates the line indication screen shown in FIG. 8 on pagination key 2-2 and the operator touches a line key of receiving line of the line keys 6-1 on the line indication screen (Step 15-7),the slave controller 3-1 recognizes a touch position of the line key through touch panel 3-31 and touch controller 3-26, searches a display information set based on the touch position, and knows a status of the line key according to the screen information. Additionally, a status of the line key means a vacant condition, a holding condition or a receiving condition of the corresponding line. When the line key is receiving a call, it is understood that a call reception responding has been done.

After detecting a touch of receiving line key at the step 15-7, the slave controller 3-1 transmits Response Information to line information controller 1-2 (Step 15-8), as well as sends information corresponding to the touched line key or Response Information (screen key data) to the master controller 3-29 (Step 15-9).

Now, Screen Key Data contains line key position information as a result of operational analysis and judgement, and information that the responded handset 3-21 is of left side or right side.

While the master controller 3-29 indicates and controls the line key which has been touched at the step 15-1 on the base of received Screen Key Data in a form of indication of your own terminal being busy as shown in FIG. 16(b), as well as indicates contents of the remote sender on a dial indicator (part of information indicator 6-8) (Step 15-10).

As described above,an execution of call reception response operation and a set of conversation channel through line controller 1-2 establishes a communication status between the telephone terminal 1-1 and a remote terminal (Step 15-11).

Next, a method for controlling color indication of the line key 6-1 displayed on the line indication screen (pagination key 2-2) of the telephone terminal 1-1 will be explained with reference to a flow chart shown in FIG. 21(a).

In FIG. 21(a), screen key in relation to changeable screen, arranged on the pagination key 2-2 of the telephone terminal 1-1 is touched, the master controller 3-29 starts a screen changeable controlling and picks up a page data (Step 17-1), further picks up a data corresponding to the respective line key 6-1 (Step 17-2). The master controller 3-29 judges whether the picked up data corresponding to the line key 6-1 are the line allotted by the own telephone terminal 1-1 (whether the picked up data is own line allotted by user oneself or not) or not (Step 17-3).

Figure 21:
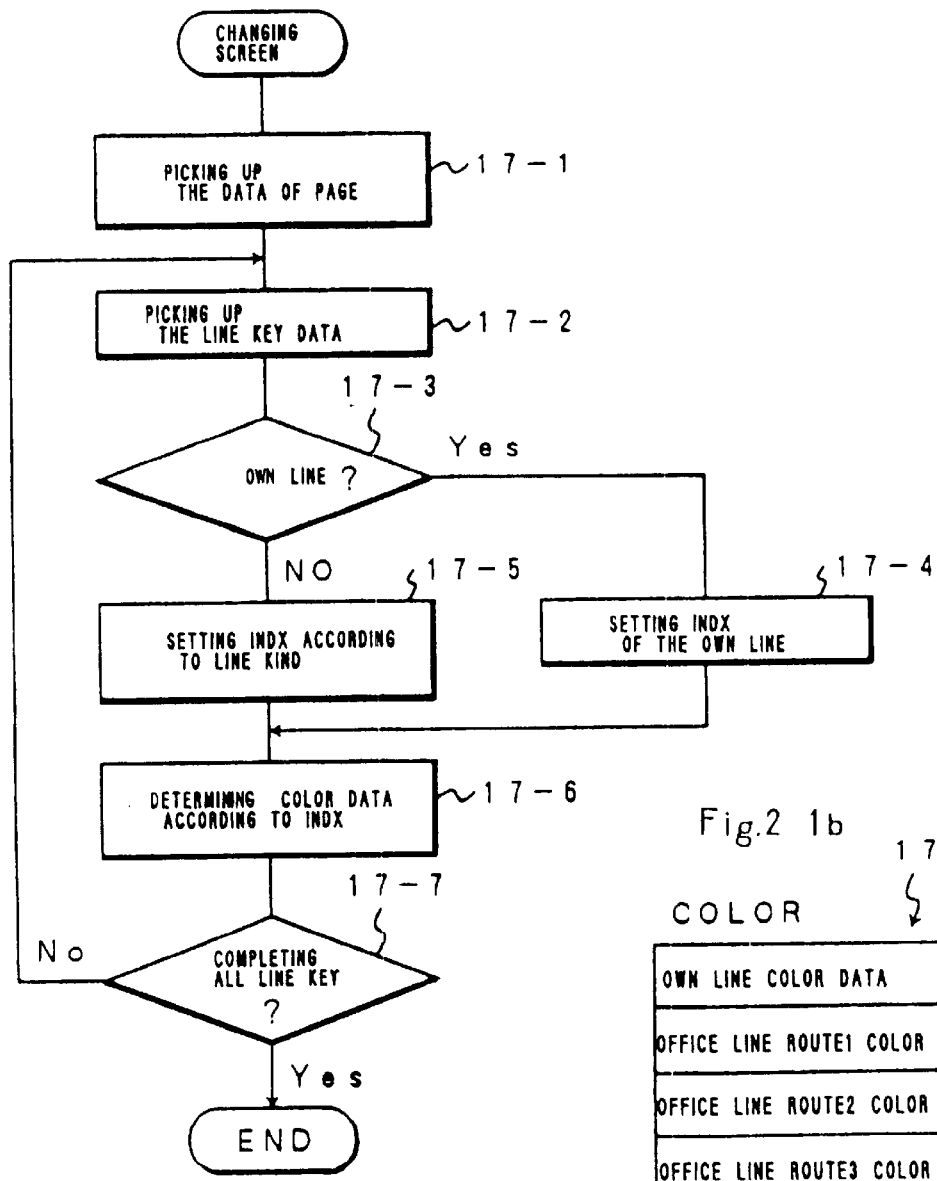
FIGS. 21(a)–21(b) show an explanation view of the color control of line keys of the telephone terminal of the embodiment.

When the master controller 3-29 in Step 17-3 judges that its data is the line (own line) allotted by the own telephone terminal 1-1, the master controller 3-29 sets "0" as INDEX (INDX) to set a color data of the own line on the basis of a color set data table (COLOR) shown in FIG. 21(*b*) (Step 17-4).

When the master controller 3-29 judges that its data is not, the master controller 3-29 recognizes line kind of the line and sets INDEX corresponding to line kind, for example, when line kind is Office line route 1, the master controller 3-29 sets "1" as INDEX, when line kind is Office line route 2, the master controller 3-29 sets "2" as INDEX, when line kind is Office line route 3, the master controller 3-29 sets "3" as INDEX, when line kind is PBX line route, the master controller 3-29 sets "4" as INDEX, when line kind is hot line route, the master controller 3-29 sets "5 as INDEX, when line kind is branch line route, the master controller 3-29 sets "6" as INDEX (Step 17-5).

The master controller 3-29 determines a color data of line key 6-1 on the basis of the setting INDEX in Step 17-4 and Step 17-5 (Step 17-6).

Next, the master controller 3-29 executes operations (from Step 17-2 to Step 17-6) until the color data of all line key 6-1 on the pagination key 2-2 has been determined (Step 17-7).

Controlling color indication corresponding to line key 6-1 and indicating in color the line key on the pagination key 2-2 enables the operator to intuitively recognize the line kind.

Figure 22:
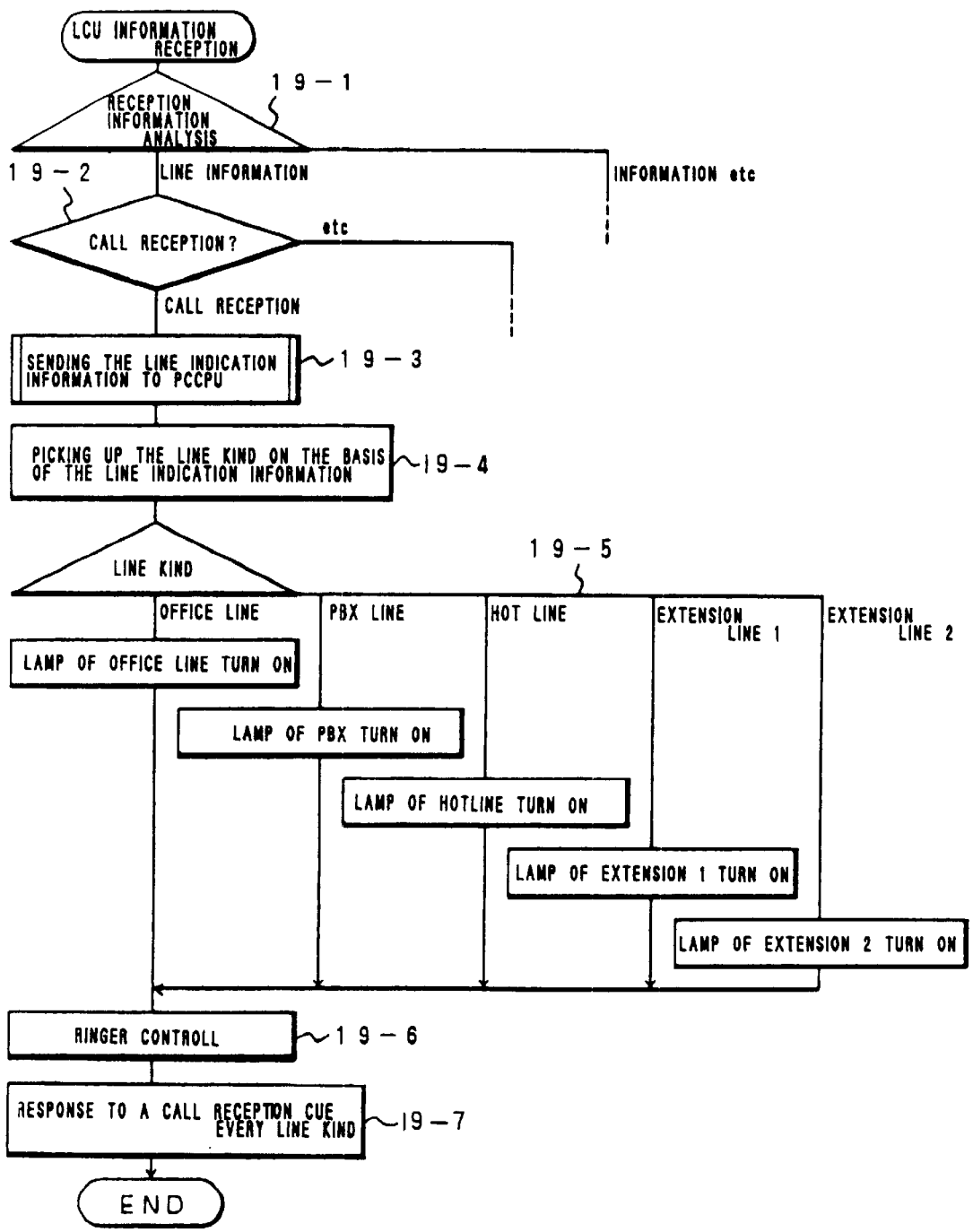
FIG. 22 is a flow chart showing an incoming call control outline of incoming call exclusive keys or extension keys of the telephone terminal according to the embodiment.

Next, an outline of handling of line call reception on call reception exclusive key 2-20 or extension key 2-21 will be explained with reference to a flow chart shown in FIG. 22.

Detecting a call received, the central controller (software) 1-20 of the line controller 1-2 sends Call Reception Information of the line to all digital telephone terminal line circuit 1-3. These digital telephone terminal line circuits 1-3 send, after receiving the Call Reception Information, the Call Reception Information as a line information to the slave controller 3-1 of all telephone terminal 1-1.

After receiving the line information, the slave controller of respective telephone terminal 1-1 analyzes the line information (Step 19-1) to decide whether the line information relates or not to the call reception (Step 19-1). If the line information relates to a call reception (step 19-2). Line Indication Information is sent to the master controller 3-29 to indicate or display a call reception on the line key 6-1 corresponding to the line information related line (Step 19-3).

Also, the master controller 3-29 indicates the objective line key 6-1 which is being indicated on the pagination key on the base of received Line Indication Information in form of indication shown in FIG. 16(*d*), as well as picks up the kind of the objective line on the base of the Line Indication Information and sends kind data to the slave controller (Step 19-4).

After receiving the data related to line kind, the slave controller 3-1 turns on and off the lamp corresponding to various line kinds (for example, in case of office line, the lamp is LED 2-71; in case of PBX, the lamp is LED 2-81 of the PBX lamp; in case of hot line, it is LED 2-91 of the hot line lamp; in case of extension 1, it is LED 2-51 of extension 1 lamp; in case of extension 2, it is LED 2-61 of the extension 2) in form shown in FIG. 15(*d*) indicating a call reception (Step 19-5).

Simultaneously with a call reception indication control operation executed every line kind, slave controller 3-1 carries out a ringer control in order to inform the operator of such call reception (Step 19-6). It is possible to set the indication kind of LEDs and sound kind of the ringer for every line kind. According to such telephone terminal 1-1, because that there is a priority order every line kind, a ringer sound of line is changed to that of the line having higher priority kind even though the call is the latter one.

After a handling of step 19-6, the slave controller 3-1 connects the data of line received preparing to response to a call reception queue (Step 19-7). The call reception queue means a data style. Because that line data are stored in the form of a chain, it is advantageous to arrange such data in order according to an order of reception. Call reception keys are prepared for every line and they are sequentially connected mutually at time of reception. When the operator responds from the head of the call row, the operator can select and respond to the most important call for him, resulting in an equal waiting time of callers.

By the way, when the program (dealing window) concerning a communication control which has started by the master controller of telephone terminal 1-1 has icons or a general application is started on a different window and a call is received during a usage of personal computer function, the method described above is executed at the side of the slave controller having no influence on the general application rings a ringer and turns on and off the lamps of respective line kinds (in FIG. 3, anyone of LED 2-27, 2-81, 2-91) as shown in FIG. 15(*d*).

In this condition, when the operator doesn't want to interrupt the current application, a pushing the call reception exclusive key 2-20 (anyone of 2-70, 2-80 or 2-90) corresponding to the on-and-off turning of LED (anyone of 2-71, 2-81 or 2-91) placed at a central lower portion of a board of the telephone terminal enables to respond to the call without any interruption, Outline of response control procedure mentioned above in the slave controller 3-1 will be explained with reference to a flow chart shown in FIGS. 23 and 24.

Figure 23:
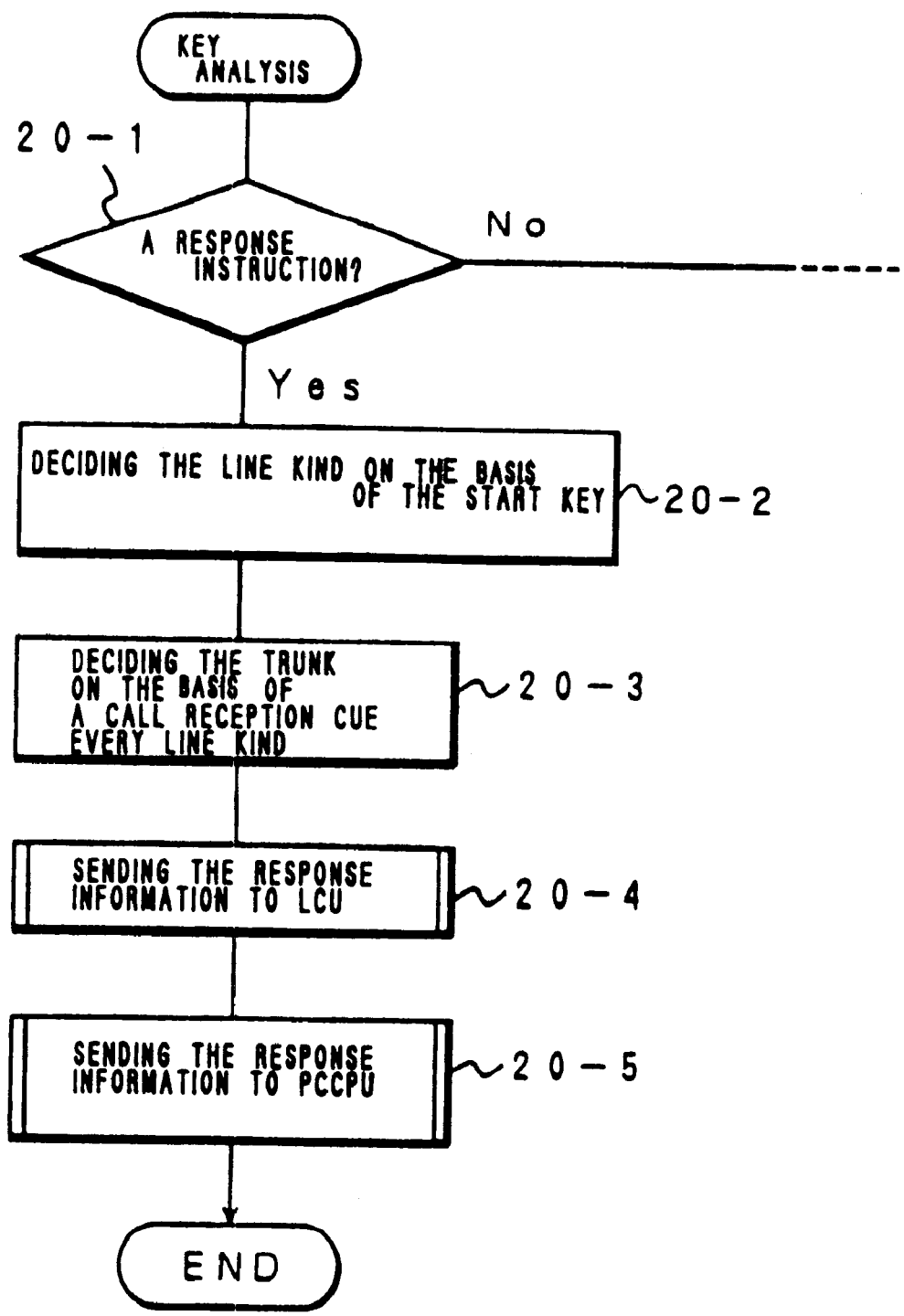
FIG. 23 is a flow chart depicting a response control outline of the slave controller within the telephone terminal of the embodiment.

When you push down a call reception key 2-20 (anyone of Office key 2-70, PBX Line key 2-80, and HOTLINE key 2-90) corresponding to an on-and-off turning of LED (anyone of 2-71, 2-81 and 2-91) showing that it is the line kind currently receiving a call, the slave controller 3-1 shown in FIG. 23 recognizes the key pushing down operation and judges that such pushing is a response instruction or not, or there is a receiving call or not (Step 20-1).

When such key pushing down is a response instruction, slave controller 3-1 decides a line kind allotted to every call reception exclusive key 2-20 on the basis of the start key of the pushed key (call reception exclusive key) 2-20 (Step 20-2), and decides a trunk through a reception queue corresponding to the line kind. That is, a trunk of the line firstly received corresponding to the line kind determined in the step 20-2 is chosen from the trunks contained in line controller 1-2 with reference to the line information stored on an order of reception in the memory (RAM 3-24)(step 20-3).

Then, the slave controller 3-1 transmits Response Information according to the decided trunk information to central controller 1-2 through a digital telephone terminal line circuit 1-3 (Step 20-4), as well as sends Response Information to the master controller in order to inform the line controller 1-2 of a sending of Response Information(Step 20-5). Thus, the received line becomes to a response and communication status, the slave controller 3-1 is connected to a telephone receiver such as a handset 3-21, a hands-free microphone 3-22, and hands-free speaker 2-29 and the operator starts a speech or conversation.

In order to respond to the line received as mentioned above, a response is executed by Extension 1 key 2-50 or Extension 2 key 2-60 and LED 2-51 or LED 2-61 corresponding to these keys is lit in the form shown in FIG. 15(*b*).

The line controller 1-2 responds to the receiving line referring to the trunk information appointed by Response Information and informs all telephone terminals 1-1 of Busy Information. It is the reason why the line controller doesn't manage line containment status of each telephone terminal as described above and all telephone terminal 1-1 respectively manage their own mechanisms themselves.

Also as shown in FIG. 24, slave controller 3-1 judges, after receiving line information form line controller 1-2, that it relates to the line or does not relate to the line by a call reception information analysis (Step 20-6). When it is line information related to the line, the slave controller 3-1 judges that the line information is Busy Information or not (Step 20-7).

When the line information is Busy Information, the slave controller 3-1 sends information for indicating that the line key 6-1 corresponding to the line information on pagination 2-2 is busy in the form of the indication shown in FIG. 16(*b*) or (*c*) (Step 20-8). It is noted that the treatment of the step 20-8 is necessary when the pagination key 2-2 shows a dealing window.

Also the slave controller 3-1 detects information of line of busy status from the memory(RAM 3-24) storing line information in an order of receptions corresponding to the line kinds previously allotted to each call reception exclusive key 2-20 (Step 20-9), and judges that there is a call received line other than that in the memory (Step 20-10). If there is another receiving line, sound kind of call reception ringer is again set and indication kind of LEDs (2-71, 2-81, 2-91), respectively corresponding to the particular line kind is again set (Step 20-12).

Operation in the step 20-12 sets at will a sound kind of call reception ringer at every line kind according to the data, decides a priority order or ranking of the sound kinds, and recognizes the line kind which is necessary to the operator by sound.

When there is no receiving line in the step 20-10, the ringer sound stops and the indicating LEDs (2-71, 2-81, 2-91) is turned off (Step 20-11).

When a dealing window is iconized or a personal computer function is under usage status after a general application starts on another window, and the call reception exclusive key 2-20 (2-71, 2-81, 2-91) each corresponding to the on and off turning LEDs (2-71, 2-81, 2-91) respectively placed at the central lower portion of the board of telephone terminal 1-1 is pushed down, the operator can respond to the receiving line without an interruption of the current application usage.

Similarly, when the communication control program (dealing window) effective by the master controller 3-29 in the telephone terminal is iconized, or personal computer function is under usage due to a start of a general application on another window and side of the slave controller 3-1 as described above rings the ringer in order to turn on or off of LEDs (2-70, 2-80, 2-90) at every line kind, it is necessary to instantly indicate an indication screen (dealing window) concerning telephone function on a screen (pagination key 2-2) of the telephone terminal 1-1.

However, in order to display again a line indication screen (dealing window) of the program concerning the telephone function that the master controller 3-29 is handling, it is necessary to interrupt the currently running application and make the program of the master controller 3-29 return from the iconized one to a full frame or select the window of program of the master controller 3-29 from a plurality of windows resulting in a response delay to a call reception due to a number of operations of the operator.

In order to solve such problem of response delay, the telephone terminal 1-1 of the invention employs a system in which a pushing Telephone Screen Return key 2-8 displays or returns, by one-touch operation, a dealing window in the display (pagination key 2-2) of the telephone terminal board under a control of the slave controller 3-1 attaining a quick response to call receptions.

Such telephone display return operation will be explained with reference to a flow chart shown in FIG. 25.

Figure 25:
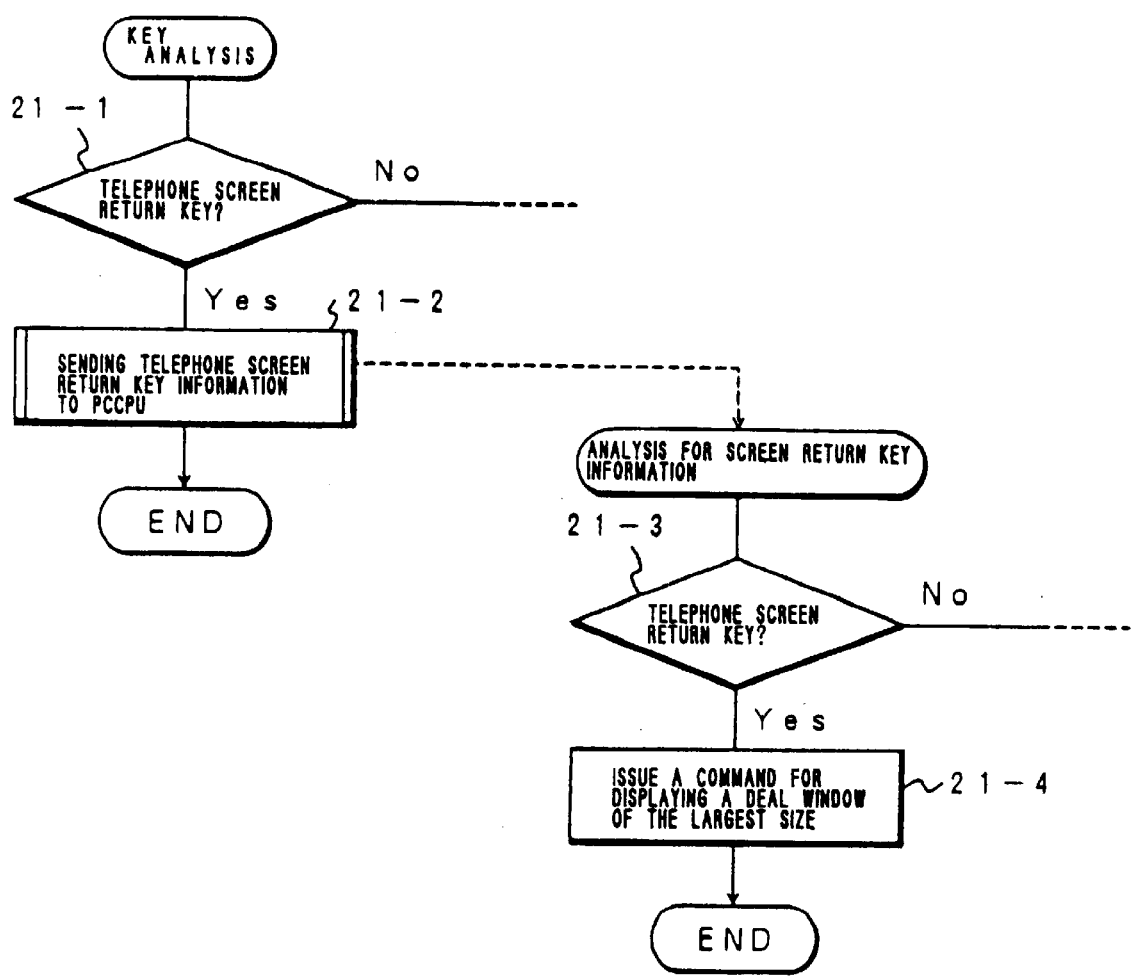
FIG. 25 is a flow chart showing a process outline of the telephone display return of the telephone terminal of the embodiment.

During an execution of general applications, you push down Telephone Screen Return key 2-8 shown in FIG. 25 and the slave controller 3-1 recognizes that certain hard key is pushed executing a key analysis operation. The key analysis operation of the slave controller 3-1 judges that Telephone Screen Return key 2-8 has been pushed down or not (Step 21-1). When it decides that Telephone Screen Return key 2-8 has been pushed, the slave controller 3-1 transmits Screen Return Key Information to the master controller (Step 21-2).

When the master controller 3-29 receives Screen Return Key Information, it analyzes the information and judges that the information is Screen Return Key Information or not. If it is Screen Return Key Information, the master controller 3-29 recognizes that Telephone Screen Return key 2-8 has been pushed down (Step 213). The master controller 3-29 sends a command for displaying a dealing window of the largest size on the first front window of the controller or an order for indicating the largest display to operation system of the master controller (Step 21-4).

On the basis of the largest display indication order from the master controller, the dealing window of the largest size is displayed on indication display (pagination key 2-2)of the telephone controller 1-1.

Consequently, the operator can return and display a dealing window on pagination key 2-2 by one-touch operation of Telephone Screen Return key 2-8 and respond quickly to the receiving line through the dealing window.

According to the embodiment of the invention, the system accommodates a number of the telephone terminal, and data stored in the telephone terminals and data the line controller 1-2 necessitates are managed by an integral management terminal (system administration terminal: SAT) 1-19.

The integral management terminal 1-19 necessitates download or upload operation of set data at the side of telephone terminal 1-1 between the telephone terminal 1-1 and the integral terminal 1-19.

Figure 26:
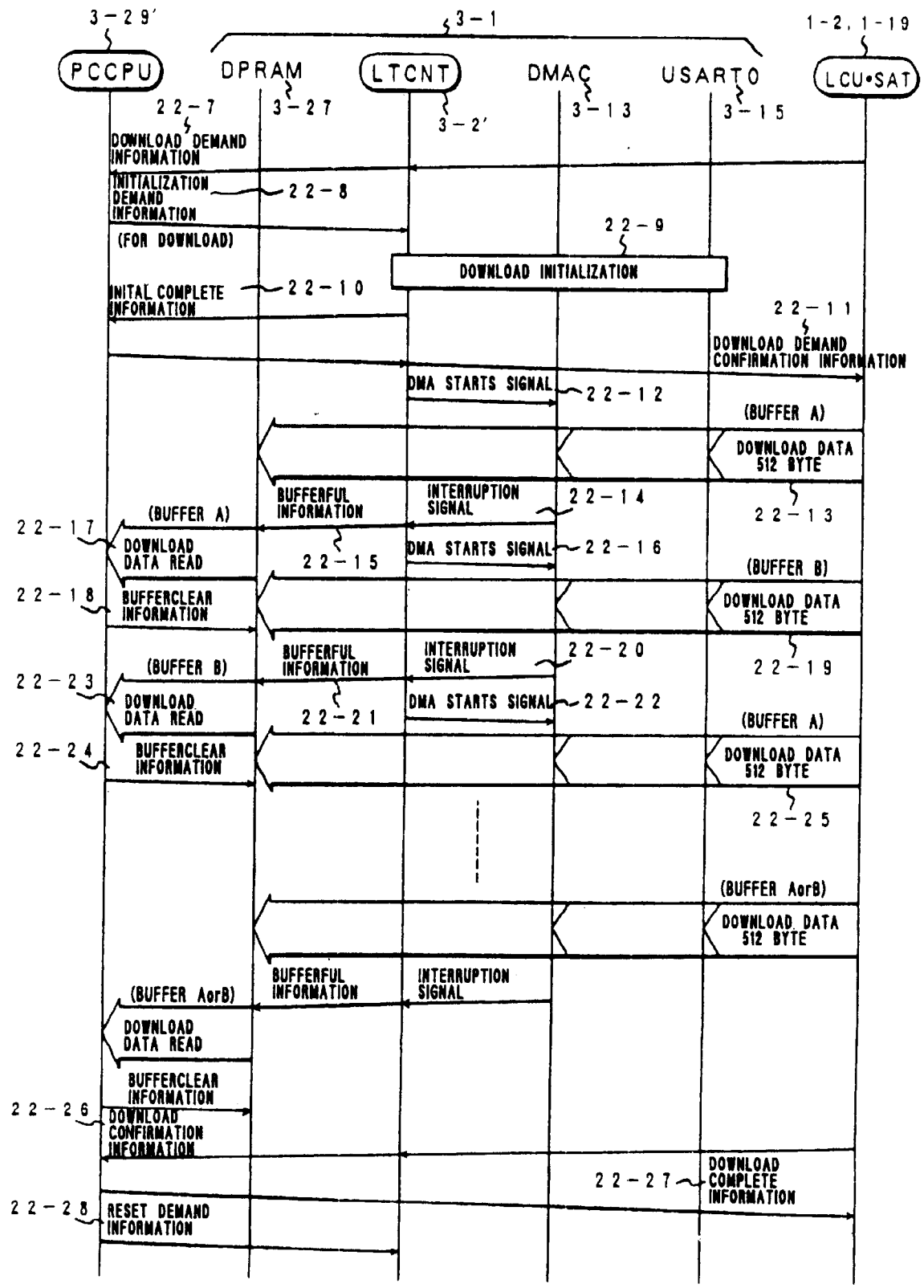
FIG. 26 shows a download sequence between the telephone terminal and the integral management terminal according to the embodiment.

Next, a download operation of the set data of the telephone terminal set in the integral management terminal 1-19 through line controller 1-2 into the telephone terminal will be explained with reference to a sequence shown in FIG. 26. 3-2 depicted in FIG. 26 shows a control software of slave controllers 3-1, and 3-29 show a control software of master controller 3-29.

First, when a download is demanded by the integral management terminal, line controller 1-2 controls the speech path switch 1-4, recognizing the download demand through a terminal adapter 1-21 and PC interface trunk 1-16, setting a passage between the PC interface trunk and all digital telephone terminal line circuits 1-3, and obtaining a download possible condition (however, except for one digital telephone terminal line circuit 1-3, a multi-pass connection is preferred, which set one-way conversation passage or route).

As a result, control software 3-2 of the slave controller 3-1 of respective telephone terminals 1-1 of the integral management terminal once receives Download Demand Information issued from the integral management terminal through D channel of the line. The Download Demand Information is then relayed to control software 3-29' of the master controller 3-29 (Step 22-7).

Next, when the software 3-29' of the master controller 3-29 receives Download Demand Information, the software prepares a download operation and transmits Initialization Demand Information for downloading to control software 3-2' of the slave controller 3-1 (Step 22-8).

Control software 3-2' of the slave controller 3-1 executes a download initialization of various hardware for preparing downloading operation after it receives an initial demand information (Step 22-9), and after the download initial operation transmits Initial Completion Information to control software 3-29' of the master controller 3-29 (Step 22-10).

Thus, after download preparation of various telephone terminal 1-1, control software 3-29' of the master controller 3-29 sends Download Demand Confirmation Information to the control software 3-2' of the slave controller 3-1, as well as the control software of the slave controller 3-1 sends Download Demand Confirmation Information to the line controller 1-2 through line D channel (Step 22-11).

Next, the control software of the slave controller sends DMA starts signal urging a direct memory access to make a direct memory access controller (DMAC) 3-13 start according to Download Demand Confirmation Information (Step 22-12).

Noteworthly, direct memory access means an operation of one byte data sequentially received by serial communication receiver/transceiver (USART0) 3-15 being sequentially stored in a download/upload buffer A 5-2 of the common memory (DPRAM) 3-27 between the slave controller 3-1 and the master controller 3-29.

Integral management terminal 1-19 contained in line controller 1-2 sends, after receiving Download Demand Confirmation Information through the line controller 1-2, 512 bytes in total every one byte of Download Data of the telephone terminal to serial communication receiver/transceiver 3-15 at side of the slave controller 3-1 through B2 channel of line (Step 22-13).

Next, DMAC 3-13 sequentially stores Download Data received by serial communication receiver/transceiver 3-15 in the common memory 3-27. DMAC 3-13 completes such sequential storing of Download Data to the common memory 3-27, after a sending of 512 bytes of Download Data from integral management terminal 1-19, and sends Interruption Signal to the control software 3-2' of the slave controller 3-1 (Step 22-14.

The control software 3-2' of the slave controller 3-1 sends, after receiving Interruption Signal from DMAC 3-13, Bufferful Information to the control software of the master controller 3-29 through the common memory 3-27 in order to prepare for the next coming download data (Step 22-15), as well as sends DMA Start Signal to DMAC 3-13 (Step 22-16).

Memory address is adapted to be set to make DMC 3-13 store, after sending DMA Start Signal to DMAC 3-13 at the step 22-16, download data sent from the integral management terminal 1-19 in download/upload buffer A 5-3.

Also, control software 3-29' of the master controller 3-29 reads out, after receiving Bufferful Information, download data stored in download/upload buffer A 5-2, stores this download data in hard disc (HDD) 2-30 through a hard disc driver 4-17 (Step 22-17), and sends Bufferclear Information to control software 3-2' of the slave controller 3-1 (Step 22-18).

During the control software 3-29' of the master controller 3-29 reads Download data from the download/upload buffer A 5-2, an integral management terminal 1-19 sends the next Download Data to serial communication receiver/transceiver 3-15 through the B channel of line by rate of 512 bytes in total every one byte (Step 22-19). Next, DMAC 3-13 sequentially stores Download Data in the serial communication receiver/transceiver 3-15 in the common memory. Then, DMAC 3-13 completes, after a sending of 512 bytes of download data from integral management terminal 1-19, a sequential storing of Download Data to the common memory, and sends Interruption Signal to control software 3-2' of the slave controller 3-1 (Step 22-20). After receiving an Interruption Signal issued from DMAC 2-1, control software 3-2' of the slave controller 3-1 sends Bufferful Information to control software 3-29' of the master controller 3-29 preparing for coming of next download data through the common memory 3-2 (Step 22-21), as well as sends DMA Start Signal to MAC 3-13 (Step 22-22).

At the step 22-22, DMA Start Signal has been sent to DMAC 3-13 and then the DMAC 3-13 sets memory address so as to store download data from the integral management terminal 1-19 in download/upload buffer A 5-2.

Also, the control software 3-29' of the master controller 3-29 reads out, after receiving Buffer Information, Download Data stored in download/upload buffer B 5-3, stores the Download Data in hard disc 2-30 (Step 22-23), and sends Bufferclear Information in control software 3-2' of the slave controller (Step 22-24).

In addition, then the download/upload buffer A 5-2 and download/upload buffer B 5-3 are controlled so as to alternately be used. Because that the download data has been stored in download/upload buffer B 5-3 even while control software 3-29' of the master controller 3-29 is reading download data stored in download/upload buffer A 5-2 as shown in the step 22-19, download data of respective download/upload buffers A and B 5-2 and 5-3 is not broken.

As described above, after the operations from the step 22-13 to step 22-24 are repeated and sending of all download data is completed by the integral management terminal 1-19, the integral management terminal 1-19 uses control software 3-2' of the slave controller 3-1 to send Download Confirmation Information to the control software 3-29' of the master controller 3-29 through D channel of line (Step 22-26).

Next, the master controller having Download Confirmation Information sends Download Completion Information containing either information showing a normal completion of downloading and other information showing an abnormal completion of downloading to the integral management terminal 1-19 (Step 22-27). Then, because that data changes and initialization of various devices and memories are necessary, Reset Demand Information is sent to control software 3-2' of the slave controller 3-1 in order to reset the control software, as well as control software 3-29' of the master controller 3-29 is initialized (Step 22-28).

Additionally, because that download sequence shown in FIG. 26 multiply-connects a conversation pass of line controller 1-2 to a plurality of the telephone terminal 1-1 in order to simultaneously download through a B2 channel, the system of returning or informing a normal condition of communication from the telephone terminal 1-1 every 512 bytes of 1 block is not used in the download sequence.

Accordingly, when it ends with an abnormal condition, telephone terminal 1-1 sends Download Completion Information including information of showing that the download ends with abnormal condition to the integral management terminal 1-19 at the step 22-27 in order to inform of an abnormal downloading to the integral management terminal 1-19.

Such integral management terminal 1-19 can download a set data of a side of the telephone terminal 1-1 to the telephone terminal itself.

Next, an operation of integral management terminal 1-19 uploading the data set in the telephone terminal through line controller 1-2 will be explained with reference to the sequence shown in FIG. 27.

First, when there is an upload demand from integral management terminal 1-19, line controller 1-2 recognizes the upload demand through a terminal adaptor 1-21 and PC interface trunk 1-16, controls a speech path switch 1-4 so as to set a conversation channel between PC interface trunk 1-16 and digital telephone terminal line circuit 1-3 of an object of the upload demand, and sets an upload possible status.

Figure 27:
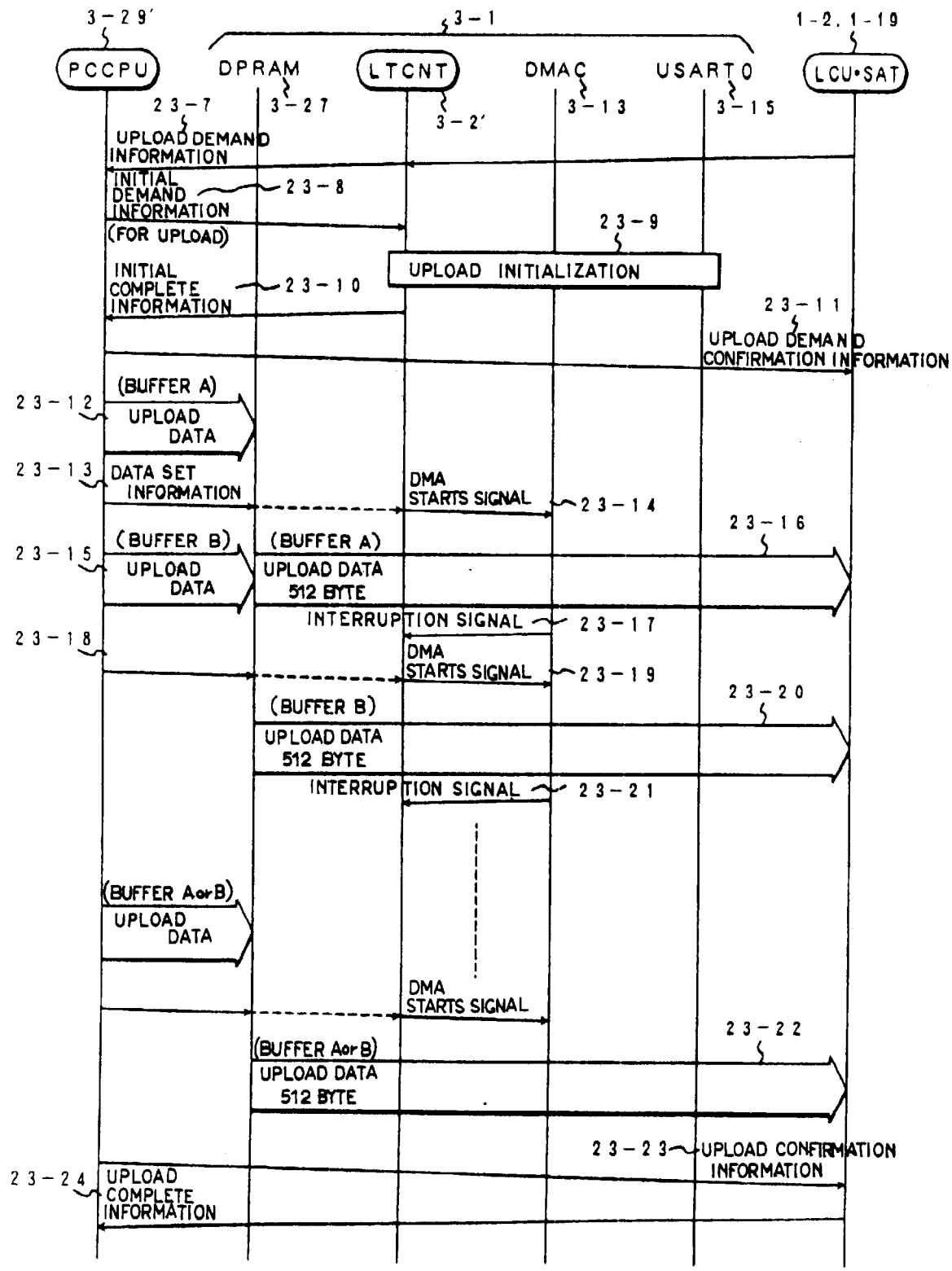
FIG. 27 depicts an upload sequence between the telephone terminal and the integral management terminal according to the embodiment.

Thus, the telephone terminal 1-1 of the object of the upload demand and connected to the integral management terminal 1-19 once receives the Upload Demand Information issued from integral management terminal 1-19 as shown in FIG. 27 by the control software 3-2' of the slave controller 3-1 through D channel of line, and relays the information to control software 3-29' of the master controller 3-29 (Step 23-7).

Receiving Upload Demand Information, control software 3-29' of the master controller 3-29 prepares for uploading and sends Initial Demand Information for uploading to control software 3-2' of the slave controller (Step 23-8).

Receiving Initial Demand Information, the control software 3-2' of the slave controller 3-1 executes initial operation for uploading various hardwares preparing for uploading (Step 23-9) and then sends Initial Completion Information to the control software 3-29' of the master controller 3-29 (Step 23-10).

As described above, upload preparation has been completed in telephone terminal 1-1 of object of the upload demand, and control software 3-29' of the master controller 3-29 sends Upload Demand Confirmation Information to line controller 1-2 through D channel of line (Step 23-11), as well as stores the upload data which is read out of a hard disc (HDD) 2-30 through a hard disc driver 4-17 in the download/upload buffer A 5-2 on the common memory (DPRAM) 3-27 placed between the slave controller 3-1 and the master controller (Step 23-12), and sends Data Set Information to control software 3-2' of the slave controller 3-1 (Step 23-13).

The control software 3-2' of the slave controller 3-1 sends DMA Start Signal urging direct memory access to start to a direct memory access controller (DMAC) 3-13 according to Data Set Information. DMA Start Signal is adapted to be sent to DMAC 3-13 at the step 23-14, and DMAC 3-13 sets memory address so as to store the next upload data to be sent from control software 3-29' of the master controller 3-29 in download/upload buffer B 5-3.

After the operation of the step 23-14, this DMAC 3-13 sends Upload Data stored in the download/upload buffer A 5-2 to integral management terminal 1-19 every one byte through serial communication receiver/transceiver (USATRTO) 3-15 and B channel of line (Step 23-16).

During the operation of the step 23-16, control software 3-29' of the master controller 3-29 stores next upload data in download/upload bufferB 5-3 (Step 23-15).

Next, after completion of sending upload data stored in download/upload buffer A 5-2, DMA 3-13 sends Interruption Signal to control soft-ware 3-2' of the slave controller 3-1 (Step 23-17), informing of a call sending completion to the slave controller 3-1.

Then control software 3-29' of the master controller 3-29 sends Data Set Information to control software 3-2' of the slave controller 3-1 (Step 23-18). This control software 3-2' of the slave controller 3-1 sends DMA Starts Signal urging direct memory access to start according to Data Set Information to dynamic access controller (DMAC) 3-13 (Step 23-19).

It is noted that DMAC 3-13 sets, after it receives DMA Start Signal in the step 23-18, the memory address so as to store next upload data to be sent from control software 3-29' of the master controller 3-29 in download/upload buffer A 5-2.

After the step 23-19, DMAC 3-13 sends Upload Data stored in the download/upload buffer B 5-3 to the integral management terminal 1-19 every one byte through serial communication receiver/transceiver (USARTO) 3-15 and B channel of line (Step 23-20). After completion of sending all Upload Data, Interruption Signal is sent to the control software 3-2' of the slave controller 3-1 (Step 23-21) informing of a call sending completion.

It is controlled that after that download/upload buffer A 5-2 and download/upload buffer B 5-3 are alternately used.

Consequently, even though DMAC 3-13 is sending upload data stored in download/upload buffer A 5-2 to the integral management terminal 1-19, upload data of respective download/upload buffer A/B 5-2/5-3 is not interrupted since next upload data in master controller 3-29 is adapted to be stored in download/upload buffer B 5-3.

The handling operations from the step 23-12 to step 23-21 are sequentially repeated. After all upload data in telephone terminal 1-1 of upload demand object are sent to the integral management terminal 1-19 (Step 23-22), the control software 3-29' of the master controller 3-29 sends Upload Confirmation Information showing a sending completion of uploading to the integral management terminal 1-19 through D channel of line (Step 23-23).

After receiving Upload Confirmation Information, this integral management terminal 1-19 send Upload Completion Information to control software 3-29' of the master controller 3-29 through D channel of line (Step 23-24). Therefore, after receiving the Upload Completion Information, the control software 3-29' of the master controller 3-29 recognizes a completion of upload data uploading and returns to ordinal operations.

As a result, in this integral management terminal 1-19, it is possible to upload the set data of the telephone terminal 1-1 side.

Operation of line key 6-1 being displayed on an indication screen (pagination key 2-2) of board of telephone terminal 1-1 is of a touch panel type. When the line key on the indication screen is touched, an identification recognizing such touching by the operator is done. The operator fails to obtain a stroking feeling of general key pushing-down and some operators demand such general stroking feeling.

In order to satisfy such demand, hard key 2-3 (line 18-1 and function key 18-2) corresponding to the indication key being displayed on pagination key 2-2 as shown in FIG. 3 of the telephone terminal 1-1 according to the invention are arranged on the board.

According to the system, hard key 2-3 is used as a function key according to an indication screen and the hard key 2-3 in the most neighborhood of the keys of indication key on the pagination key 2-2 has a function corresponding to the indicated key. It is possible to use the hard key 2-3 as a stable line key in no connection with the indicated key notwithstanding a function of the indication key.

Next, control handling of hard key 2-3 will be explained with reference to a flow chart shown in FIG. 28.

Figure 28:
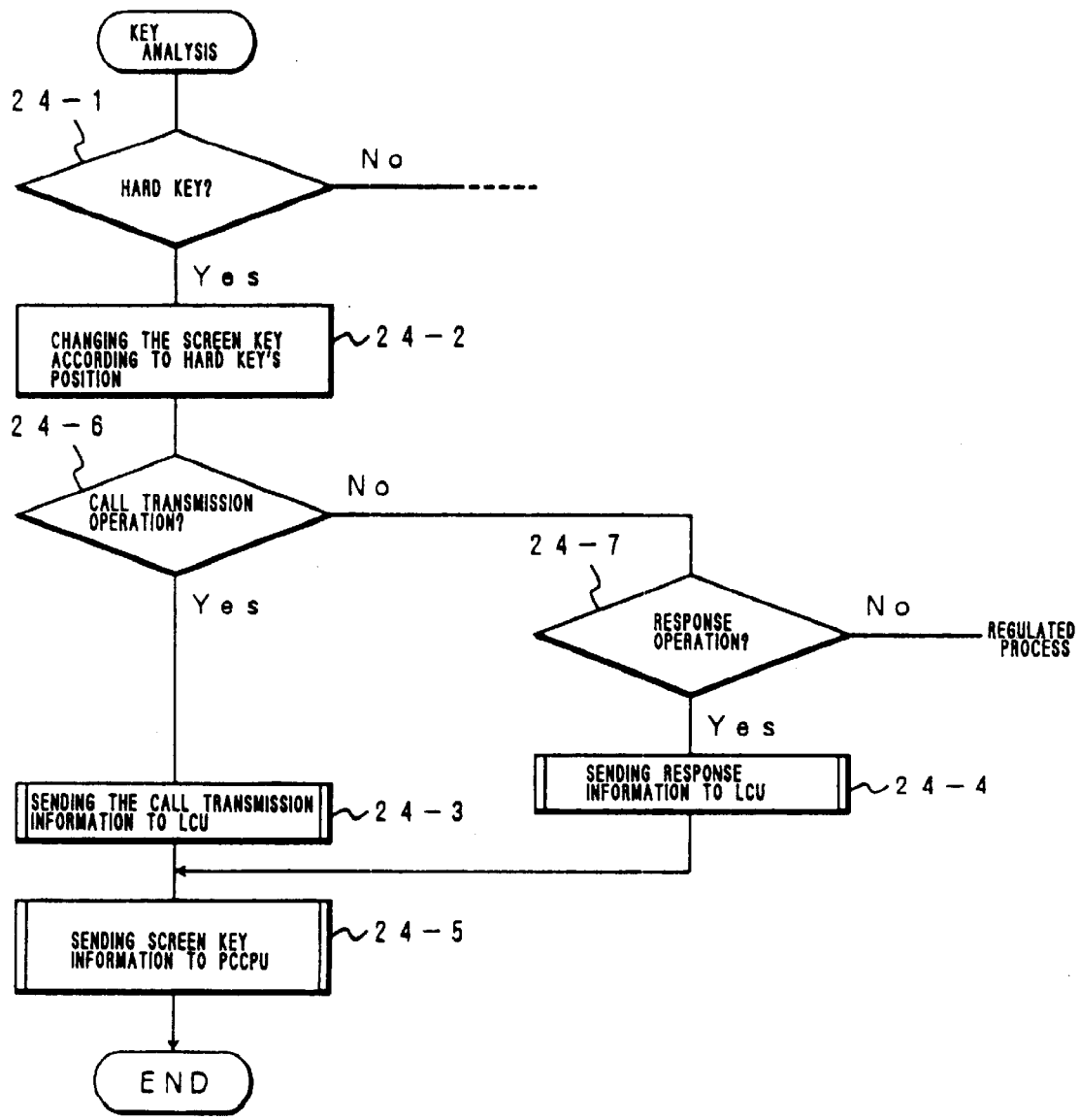
FIG. 28 is a flow chart showing a line hard key control outline of the telephone terminal according to the embodiment.

As shown in FIG. 28, after pushing-down anyone of hard keys 2-3, the slave controller 3-1 reads such pushing-down by keyboard controller 3-32 and a key analysis routine recognizes a key of hard key 2-3 (Step 24-1) and it is changed to the screen key corresponding to the hard key 2-3 according to its position information (Step 24-2).

If line key 6-1 on the display is at non-use condition, down-pushing of hard key in the step 24-1 is recognized as a call transmission operation (Step 24-6), Call Transmission Information is sent to the line controller 1-2 (Step 24-3). After that, it is handled as a call transmission of the line key 6-1 on the display of a sequence identical with the line call transmission described above and Screen Key Information is sent to the master controller 3-29 (Step 24-5).

In the step 24-6 operation, when line key 6-1 on the display is receiving a call or holding a call, down-pushing of hard key 2-3 in the step 24-1 is recognized as a response operation (Step 24-7), Response Information is sent to the line controller 1-2 (Step 24-2), then it is handled as a call transmission of the line key 6-1 on the display of sequence identical with line response.

That is, control of hard key 2-3 can be attained by only the slave controller 3-1 and the master controller 3-29 is controlled by one which is completely identical with line key 6-1 on display.

It is possible to set data in the slave controller 3-1 so as to use previously this hard key 2-3 as a fixed line without any relation with every display. In this case, it is obvious that it is not necessary to send a piece of Screen key information to the master controller 3-29.

Next, appearance of another telephone terminal smaller than the telephone terminal 1-1 shown in FIG. 1 will be explained with reference to FIGS. 29(a)–29(d). The appearance of telephone terminal 1-1' having the function identical with another telephone terminal 1-1 shown in FIG. 1, a small size, and an improved operability is depicted in FIGS. 29(a)–29(d). FIG. 29(a) is a front view; FIG. 29(b) is left side view of telephone terminal 1-1' turned; FIG. 29(c) is a right side view; and FIG. 29(d) is a plane view of the terminal.

As shown in FIGS. 29(a)-(d), the board of a housing 2-1' of the telephone terminal 1-1' has a pagination key 2-2' of a combination of color screen (TFT/STN color LCD display) of about 10 inch and a pressure sensitive touch panel mounted on the color display, a plurality of function keys 2-4' correspondingly mounted on left and right handsets (not shown), a plurality of extension keys 2-21', a number of concentrated reception indication response (only call reception) mounted on every line kind, POW key 2-77 for turning on and off by means of a software the power source of telephone terminal 1-1', Telephone Screen Return key 2-8' for changing by one-touch its condition from a personal computer function active one (personal computer application is under use) to a line screen active one (indication of telephone function screen), and a hands-free speaker 2-9'.

Pagination key 2-2' of the function keys 2-4', extension keys 2-21' concentrated reception indication response (call reception only) keys 2-20', POW key 2-7', Telephone Screen Return key 2-8', hands-free speaker 2-9' and modular jack 2-18' of the telephone terminal 1-1', respectively have the functions identical with that of the pagination keys 2-2, function keys 2-4, extension keys 2-21, concentrated reception indication response (call reception only) keys 2-20', POW key 2-7, Telephone Screen Return key 2-8, hands-free speaker 2-9, and modular jack 2-18 of the telephone terminal 1-1, so that their detailed explanation are omitted. That the LEDs corresponding to function keys 2-4', extension key 2-21', concentrated reception indication response (call reception only) key 2-20', POW key 2-7' and Telephone Screen Return key 2-8' are installed in order to indicate various conditions is the same as that of telephone terminal 1-1 shown in FIG. 2.

As shown in FIG. 29(b), a main body 2-1' of the telephone terminal 1-1' can be slanted at will between about 20 to 80 degree of angle. Also, the telephone terminal 1-1' has extension key 2-21', concentrated reception indication response (call reception only) key 2-20', POW key 2-7', and Telephone Screen Return key 2-8', which are arranged on board upper portion, and function keys 2-4, which are placed at left and right sides of the board by handsets mounted at the left and right, in order to improve an operability of the operator.

Telephone terminal 1-1' doesn't have keys of hard key 2-3 telephone terminal 1-1 shown in FIG. 2, however their functions are supplemented by that of pagination key 2-2' miniaturizing the main body 2-1'.

Furthermore, sound volume controller 2-10, tape recorder connection jack 211, floppy disc driver 2-12, power source input connector 2-14, main power source switch 2-15, brightness control volume of screen 2-16, and microphone attachment 217, which are installed on the telephone terminal 1-1', are installed in a separate control box or optional adaptor (not shown).

As described above, because that telephone terminal 1-1' shown in FIG. 29 has various keys mounted on the upper portion and left and right sides of the board of telephone terminal 1-1', operability of the system of the invention can be improved. Also, different control box is employed, so the size of the main body of the telephone terminal becomes small realizing that it is used in a small space, As described above, the telephone terminal and telephone change system accommodating the terminal of the invention are usefully employed as speech terminals of dealing speech system used to execute financial transactions of banks and securities companies and the like, speech terminals for jewel dealing business, receptionist desk terminals of taxi companies and transportation companies, urgent countermeasure announcing terminals for banking, or general office telephones.

We claim:

1. A telephone terminal connected to a line, comprising:
   a display;
   a first controller having a first microprocessor (MPU) for controlling the display;
   a line control means for executing an interfacing function with said line;
   a detection means for detecting operational selection of information concerning speech controls displayed on the display; and a second controller having a second MPU for controlling the line control means and the detection means, wherein the second controller has means for sending a display instruction information corresponding to a selection information to the first controller when the second controller receives the selection information with reference to operational selection from the detection means, and means for sending speech controls information to the line control means, and wherein the detection means is constructed by touch keys mounted on the display.

2. The telephone terminal according to claim 1, wherein the telephone terminal has a common memory accessible to both the first controller and the second controller, the second controller has means for sending the display instruction information to the first controller through the common memory.

3. The telephone terminal according to claim 1, wherein the telephone terminal is under controls of the first controller and has a memory means for storing control information used by the second controller, and said first controller has means for relaying the control information stored in the memory means to the second controller through the common memory after a start of the telephone terminal.

4. The telephone terminal according to claim 1, wherein the second controller has means for monitoring an operative condition of the first controller and means for sending a re-start signal to the second controller when an abnormal condition of the first controller is recognized.

5. The telephone terminal according to claim 1, further comprising display control means for controlling a display of a multi-window in the display, and indication contents informing means for informing of contents information which indicates indication contents displayed on the display.

6. The telephone terminal according to claim 5, further comprising a common memory to which both the indication contents informing means and the second controller are accessible, and the indication contents informing means informs of the contents information to the second controller through the common memory.

7. The telephone terminal according to claim 6, wherein the second controller has an analysis means for analyzing selection information corresponding to the operational selection when the detection means detects the operational selection, and recognizing means for recognizing speech control information corresponding to the selection information analyzing by the analysing means on the basic of the contents information.

8. The telephone terminal according to claim 5, wherein the second controller has an analyzing means for analysing selection information corresponding to the operational selection when the detection means detects the operational selection, and recognizing means for recognizing speech control information corresponding to the selection information analyzed by the analyzing means on the basis of the contents information.

9. The telephone terminal according to claim 1, wherein the display is disposed on a computer panel, the telephone terminal further comprising an incoming call reception key disposed on the display panel adjacent to the display and operable under control of the second controller, wherein the second controller has a means for executing response operation for an incoming call receiving line according to an input of the response key when an incoming call is received by the line responsible by the telephone terminal.

10. The telephone terminal according to claim 9, further comprising an incoming call display means corresponding to said incoming call reception response key, wherein the second controller has means for displaying an incoming call reception on the incoming call display means corresponding to the incoming call reception response key concerning the receiving line.

11. The telephone terminal according to claim 1, further comprising hard keys corresponding to keys at left and right sides of the touch keys and being placed at both left and right sides of the display, wherein the second controller has means respectively operating for operation of a touching of the touch key and a down-pushing of the hard key.

12. The telephone terminal according to claim 1, wherein the display is disposed on a computer panel, the telephone terminal further comprising an extension key disposed on the computer panel adjacent to the display and usable to response with reference to an extension call transmission or an extension call reception, wherein the second controller has a means for executing responding operations for the extension call transmission or the extension call reception when an input of the extension key is detected.

13. The telephone terminal according to claim 1, wherein the display is a TFT or STN color display, and the first controller has means for identifying and indicating a line key condition of information concerning speech controls displayed on the display by means of indication of colors and flickering of the indication of colors.

14. The telephone terminal according to claim 1, further comprising a telephone function demand key, wherein the second controller has means for sending key input information indicating the input to the first controller when the second controller detects operation of the telephone function demand key, and wherein the first controller has means for indicating information concerning the speech controls on the display when the first controller receives the key input information.

15. The telephone terminal according to claim 1, wherein the second controller has judging means for judging whether or not a dial input operation is necessary to a call transmission operation when a call transmission is recognized, and means for informing and urging the first controller to display a window indication of dial key on the display.

16. The telephone terminal according to claim 1, wherein the display includes a plurality of line indication touch buttons corresponding to a plurality of lines that are displayed under control by the first controller, wherein, in a first state of the telephone terminal in which a quick call catching is desired, the second controller recognizes operation of one of the line indication touch buttons on the display, retrieves information related to a current status of the corresponding one of the lines and the telephone terminal, and if a call transmission is allowable, the second controller sends a transmission outgoing call information to the line control means, and the line control means catches the corresponding line so as to allow the call transmission to be made over the corresponding line, and wherein, in a second state of the terminal in which the quick call catching is not desired, the second controller recognizes operation of one of the line indication touch buttons on the display and informs the first controller of the operation of the one of the line indication touch buttons, the first controller retrieves information related to the current status of the corresponding one of the lines and the telephone terminal, and if a call transmission is allowable, the first controller sends the transmission outgoing call information to the line control means, and the line control means catches the corresponding line so as to allow the call transmission to be made over the corresponding line.

17. The telephone terminal according to claim 1, wherein the first and second controllers each periodically carry out access to the common memory in a normal operation mode of the first and second controllers, and wherein, when the second controller does not carry out periodic access to the common memory within a certain time frame, the second controller determines that the first controller is in an abnormal state, and causes the first controller to enter a reset state.

18. A telephone terminal connected to a line, comprising:
a display;
a first controller for controlling the display;
a line control means for executing an interfacing function with the line;
a detection means for detecting operational selection of information concerning speech controls displayed on the display;
a second controller for controlling the line control means and the detection means; and
a common memory having a first port accessible to the first controller and a second port accessible to the second controller,
wherein the second controller has means for sending display instruction information corresponding to selection information to the first controller through the common memory when the second controller receives the selection information with reference to operational selection from the detection means, and means for sending speech control information to the line control means, and
where in the detection means is constructed by touch keys mounted on the display.

19. The telephone terminal according to claim 18, wherein the telephone terminal is under control of the first controller and has a memory means for storing control information used by the second controller, and wherein the first controller has means for relaying the control information stored in the memory means to the second controller through the common memory after a start of the telephone terminal.

20. The telephone terminal according to claim 18, wherein the second controller has means for monitoring an operative condition of the first controller and has means for sending a re-start signal to the second controller when an abnormal condition of the first controller is detected.

21. The telephone terminal according to claim 20, wherein the second controller comprises:

an analysis means for analyzing selection information corresponding to the operational selection when the detection means detects the operational selection; and a recognizing means for recognizing speech control information corresponding to the selection information analyzed by the analysis means on the basis of the contents information.

22. The telephone terminal according to claim 18, further comprising:

a display control means for controlling an appearance of a multi-window in the display; and an indication contents informing means for informing to the second controller of contents information which indicates what is displayed on the display.

23. The telephone terminal according to claim 18, further comprising an incoming call reception response key operable under control of the second controller, wherein the second controller has means for executing response operation for an incoming call receiving line to an input of the incoming call reception response key when an incoming call is received by the line responsible by the telephone terminal.

24. The telephone terminal according to claim 23, further comprising incoming call display means corresponding to the incoming call reception response key, wherein the second controller has means for displaying an incoming call reception on the incoming call display means to the incoming call reception response key concerning the receiving line.

25. The telephone terminal according to claim 18, further comprising hard keys corresponding to keys on left and right sides of the touch key and being located at both left and right sides of the display, wherein the second controller has means respectively operating for either operation of the touch key and down-pushing of any of the hard keys.

26. The telephone terminal according to claim 18, further comprising an extension key usable to respond with reference to one of an extension call transmission and an extension call reception, wherein the second controller has means for executing responding operations for said one of the extension call transmission and extension call reception when an input of the extension key is detected.

27. The telephone terminal according to claim 18, wherein the display is one of a TFT and a STN color display, and wherein the first controller has means for identifying and indicating a line key condition of information concerning speech controls displayed on the display by means of indication colors and flickering of colors.

28. The telephone terminal according to claim 18, further comprising telephone function demand keys, wherein the second controller has means for sending a key input information indicating input of the telephone function demand key to the first controller when the second controller detects input by the telephone function demand key, and wherein the first controller has means for indicating information concerning speech controls on the display when the first controller receives the key input information.

29. The telephone terminal according to claim 18, wherein the second controller comprises:

judging means for judging whether a dial input operation is necessary or not to a call transmission operation when a call transmission is recognized; and means for informing and urging the first controller to display a window indication of a dial key on the display.

* * * * *